United States Patent
Lu et al.

(10) Patent No.: US 9,836,135 B2
(45) Date of Patent: Dec. 5, 2017

(54) ELECTROMAGNETIC-TYPE TOUCH PANEL, METHOD FOR DRIVING AND DETECTING ELECTROMAGNETIC-TYPE TOUCH PANEL, AND COORDINATE INPUT DEVICE

(71) Applicants:Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Qijun Yao, Shanghai (CN); Xianxiang Zhang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 540 days.

(21) Appl. No.: 14/516,519

(22) Filed: Oct. 16, 2014

(65) Prior Publication Data
US 2015/0277591 A1   Oct. 1, 2015

(30) Foreign Application Priority Data
Mar. 28, 2014 (CN) .......................... 2014 1 0124031

(51) Int. Cl.
| | |
|---|---|
| G06F 3/041 | (2006.01) |
| G06F 3/0354 | (2013.01) |
| G01B 7/004 | (2006.01) |
| G01D 9/20 | (2006.01) |
| G06F 3/046 | (2006.01) |
| G01D 5/20 | (2006.01) |

(52) U.S. Cl.
CPC ......... G06F 3/03545 (2013.01); G01B 7/004 (2013.01); G01D 9/20 (2013.01); G06F 3/046 (2013.01); G06F 3/0416 (2013.01); G06F 3/0418 (2013.01); *G01D 5/2073* (2013.01)

(58) Field of Classification Search
CPC ..................................................... G06F 3/046
See application file for complete search history.

(56) References Cited

U.S. PATENT DOCUMENTS

| | | | |
|---|---|---|---|
| 4,848,496 A | 7/1989 | Murakami et al. | |
| 2013/0176071 A1* | 7/2013 | Kim ....................... | H03K 17/96 327/517 |

FOREIGN PATENT DOCUMENTS

CN     102141867 A     8/2011

* cited by examiner

*Primary Examiner* — Dennis Joseph
(74) *Attorney, Agent, or Firm* — Alston & Bird LLP

(57) ABSTRACT

An touch panel detecting a touch position of an electromagnetic stylus is disclosed. The touch panel includes first and second coils, and drive and detection circuits. The first coils include a plurality of subgroups of first coils, which includes a first group of first coils and a second group of first coils. The first group of first coils includes at least one subgroup of first coils, and the second group of first coils includes at least one subgroup of first coils. In addition, subgroups of the first and second groups of first coils are alternately arranged. The first group of first coils receive a signal from the drive circuit and emit signals, the second group of first coils receive signals from the stylus and generate induction signals, and the detection circuit determines a value of a coordinate of the touch position of the stylus based on the induction signals.

17 Claims, 17 Drawing Sheets

ELECTROMAGNETIC-TYPE TOUCH PANEL, METHOD FOR DRIVING AND DETECTING ELECTROMAGNETIC-TYPE TOUCH PANEL, AND COORDINATE INPUT DEVICE

CROSS REFERENCE TO RELATED APPLICATIONS

This application claims the benefit of priority to Chinese Patent Application No. 201410124031.8, filed with the Chinese Patent Office on Mar. 28, 2014 and entitled "ELECTROMAGNETIC-TYPE TOUCH PANEL, METHOD FOR DRIVING AND DETECTING ELECTROMAGNETIC-TYPE TOUCH PANEL, AND COORDINATE INPUT DEVICE", the content of which is incorporated herein by reference in its entirety.

TECHNICAL FIELD

The disclosure relates to the field of electromagnetic-type touch, and particularly, to an electromagnetic-type touch panel, a method for driving and detecting the electromagnetic-type touch panel, and a coordinate input device including the electromagnetic-type touch panel.

BACKGROUND OF THE INVENTION

In recent years, with the development in humanity and convenience, touch panels and display panels or display devices with touch function become more and more popular. Based on different working principles, there are several kinds of touch panel, such as a resistive-type touch panel, a capacitive-type touch panel and an electromagnetic-type touch panel. The resistive-type touch panel and the capacitive-type touch panel can be operated directly with a hand. In the case that a stylus is adopted to write, it is difficult to accurately distinguish a touch of the hand from that of the stylus since the hand generally contacts the touch panel. The electromagnetic-type touch panel mainly includes a plurality of electromagnetic induction coils or antennas, arranged in an X-direction and in a Y-direction, and a positioning device (such as an electromagnetic stylus). The electromagnetic-type touch panel can accurately determine a position of the electromagnetic stylus even though the hand contacts the touch panel.

FIG. 1a is a schematic structural diagram of a conventional electromagnetic-type touch panel. As showed in FIG. 1a, the electromagnetic-type touch panel includes: first coils 11 (including 11-1, 11-2, 11-3 . . . and 11-48) arranged in an X-direction and extending in a Y-direction, and second coils 12 (including 12-1, 12-2, 12-3 . . . and 12-48) arranged in the Y-direction and extending in the X-direction. Generally, the first coils 11 and the second coils 12 are crossed with each other and are insulated from each other, and both of the first coils and the second coils are provided on a substrate (not shown in FIG. 1a). Taking the first coils 11 as an example and in conjunction with FIGS. 1b and 1c, a method for driving and detecting the conventional touch panel is described. After being applied with a drive signal and emitting an electromagnetic signal, each first coil receives an electromagnetic signal reflected by an electromagnetic stylus and generates an induction signal. The first coil 11-1 is applied with the drive signal and accordingly emits the electromagnetic signal. The electromagnetic stylus receives the electromagnetic signal emitted from the first coil 11-1. A resonance circuit (such as an LC resonance circuit) in the electromagnetic stylus generates an electromagnetic signal having a same frequency as the electromagnetic signal emitted by the first coil 11-1, and the electromagnetic stylus emits the generated electromagnetic signal. The first coil 11-1 generates an induction signal (which is generally an induced voltage) after receiving the electromagnetic signal emitted by the electromagnetic stylus. Similarly, each of the first coils 11-2, 11-3 . . . and 11-48 generates an induction signal. Therefore, 48 induction signals are generated. A function fitting (such as a quadratic function fitting) is performed on the 48 induction signals, and a value corresponding to a peak (Xp) of a fitted curve is taken as an X-direction coordinate of a touch position of the electromagnetic stylus.

With the foregoing touch panel and method for driving and detecting the touch panel, the touch position of the electromagnetic stylus may be well determined, while the detection efficiency needs to be improved.

BRIEF SUMMARY OF THE INVENTION

One inventive aspect is an electromagnetic-type touch panel for detecting a touch position of an electromagnetic stylus. The touch panel includes a first substrate, a plurality of first coils arranged on the first substrate and extending in a first direction, a plurality of second coils arranged on the first substrate and extending in a second direction, and a drive circuit and a detection circuit electrically connected with the first coils and the second coils. The plurality of first coils includes a plurality of subgroups of first coils, and each subgroup of first coils includes at least one first coil. The plurality of subgroups of first coils includes a first group of first coils and a second group of first coils, where the first group of first coils includes at least one subgroup of first coils, and the second group of first coils includes at least one subgroup of first coils. In addition, subgroups of first coils in the first group of first coils and subgroups of first coils in the second group of first coils are alternately arranged. The first group of first coils simultaneously receive a drive signal from the drive circuit and emit electromagnetic signals, the second group of first coils receive electromagnetic signals from the electromagnetic stylus and generate first induction signals, and the detection circuit determines a preliminary value of a second direction coordinate of the touch position of the electromagnetic stylus based on the first induction signal.

Another inventive aspect is a coordinate input device. The input device includes an electromagnetic stylus and an electromagnetic-type touch panel for detecting a touch position of the electromagnetic stylus. The electromagnetic-type touch panel includes a first substrate, a plurality of first coils arranged on the first substrate and extending in a first direction, and a plurality of second coils arranged on the first substrate and extending in a second direction. The input device also includes a drive circuit and a detection circuit electrically connected with the first coils and the second coils. The plurality of first coils includes a plurality of subgroups of first coils, each subgroup of first coils includes at least one first coil, and the plurality of subgroups of first coils includes a first group of first coils and a second group of first coils. The first group of first coils includes at least one subgroup of first coils, the second group of first coils includes at least one subgroup of first coils, and subgroups of first coils in the first group of first coils and subgroups of first coils in the second group of first coils are alternately arranged. The first group of first coils simultaneously receive a drive signal from the drive circuit and emit electromagnetic signals, the second group of first coils receive electromagnetic signals from the electromagnetic stylus and generate first induction signals, and the detection circuit determines a preliminary value of a second direction coordinate of the touch position of the electromagnetic stylus based on the first induction signals.

Another inventive aspect is a method for driving and detecting an electromagnetic-type touch panel. The method is for detecting a touch position of an electromagnetic stylus, where the electromagnetic-type touch panel includes a first substrate, and a plurality of first coils extending in a first direction and a plurality of second coils extending in a second direction. The first coils and the second coils are arranged on the first substrate, the plurality of first coils includes a plurality of subgroups of first coils, each subgroup of first coils includes at least one first coil, and the plurality of subgroups of first coils includes a first group of first coils and a second group of first coils. The first group of first coils includes at least one subgroup of first coils, the second group of first coils includes at least one subgroup of first coils, and subgroups of first coils in the first group of first coils and subgroups of first coils in the second group of first coils are alternately arranged. The plurality of second coils includes a plurality of subgroups of second coils, each subgroup of second coils includes at least one second coil, and the plurality of subgroups of second coils includes a first group of second coils and a second group of second coils. The first group of first coils includes at least one subgroup of first coils, the second group of first coils includes at least one subgroup of first coils, and subgroups of second coils in the first group of second coils and subgroups of second coils in the second group of second coils are alternately arranged. The method for driving and detecting the electromagnetic-type touch panel includes performing a preliminary detection, and performing an accurate detection, where performing the preliminary detection includes performing a preliminary detection for a second direction coordinate, where performing the preliminary detection for the second direction coordinate includes applying a drive signal simultaneously to the first group of first coils, and causing the first group of first coils to emit electromagnetic signals. The method also includes detecting first induction signals from the second group of first coils, and determining a preliminary value of the second direction coordinate of the touch position of the electromagnetic stylus based on the first induction signals.

BRIEF DESCRIPTION OF THE DRAWINGS

FIG. 1b is a schematic diagram showing a principle for driving and detecting first coils shown in FIG. 1a;

DETAILED DESCRIPTION OF THE PREFERRED EMBODIMENTS

In the disclosure, a detection for a touch position of an electromagnetic stylus on an electromagnetic-type touch panel includes a preliminary detection and an accurate detection. In the preliminary detection, coils in a certain direction (a first direction or a second direction) are grouped into two groups. Each group includes at least one subgroup of coils, and each subgroup of coils includes at least one coil. One group of coils receive a drive signal and emit electromagnetic signals, and the other group of coils receive electromagnetic signals and generate induction signals. In this way, a preliminary value of the touch position of the electromagnetic stylus may be quickly and approximately determined by one electromagnetic signal transmission and one electromagnetic signal reception. Approximate touch positions in the first direction and in the second direction may be both determined with the above described approach. In the accurate detection, coils located close to the preliminary value of the touch position of the electromagnetic stylus as determined in the preliminary detection are driven in sequence. Each coil applied with a driven signal emits an electromagnetic signal, receives an electromagnetic signal from the electromagnetic stylus, and generates an induction signal. In this way, an accurate value of the touch position of the electromagnetic stylus can be accurately determined. Accurate touch positions in the first direction and in the second direction may be both determined with the above described approach. In a conventional electromagnetic-type touch panel, all coils need to be accurately detected. In the electromagnetic-type touch panel according to the embodiment of the disclosure, first, an approximate touch position is quickly obtained in the preliminary detection, and then the accurate detection is performed on the coils located close to the approximate touch position. Therefore, there is no need to perform the accurate detection on all coils in the electromagnetic-type touch panel, and accordingly, the detection efficiency is greatly improved.

An Embodiment

Figure 1A:
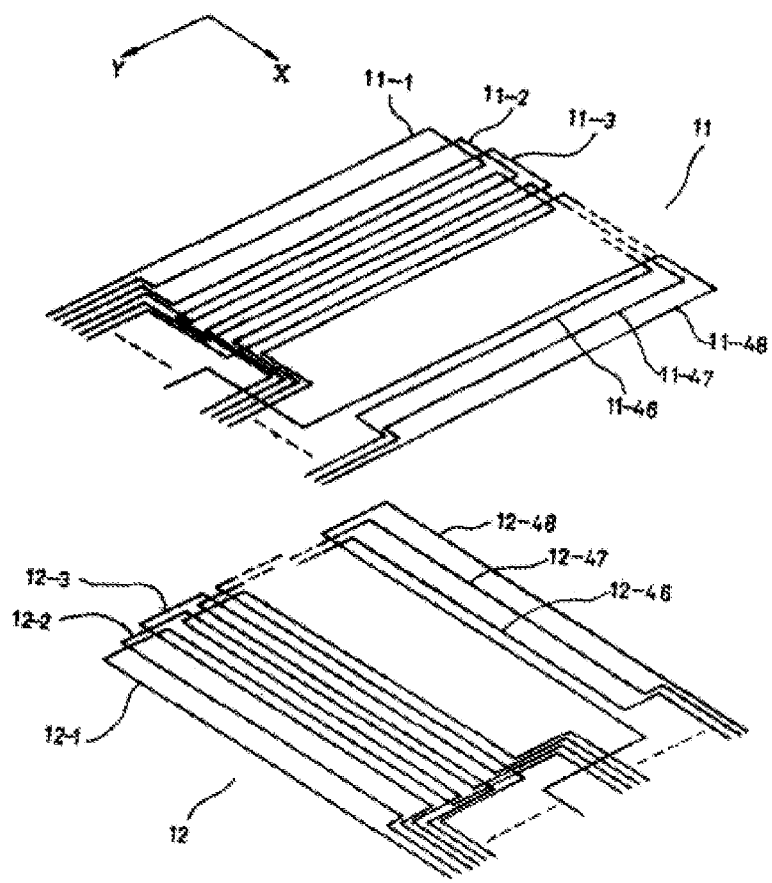
FIG. 1a is a schematic structural diagram of a conventional electromagnetic-type touch panel.
Figure 1B:
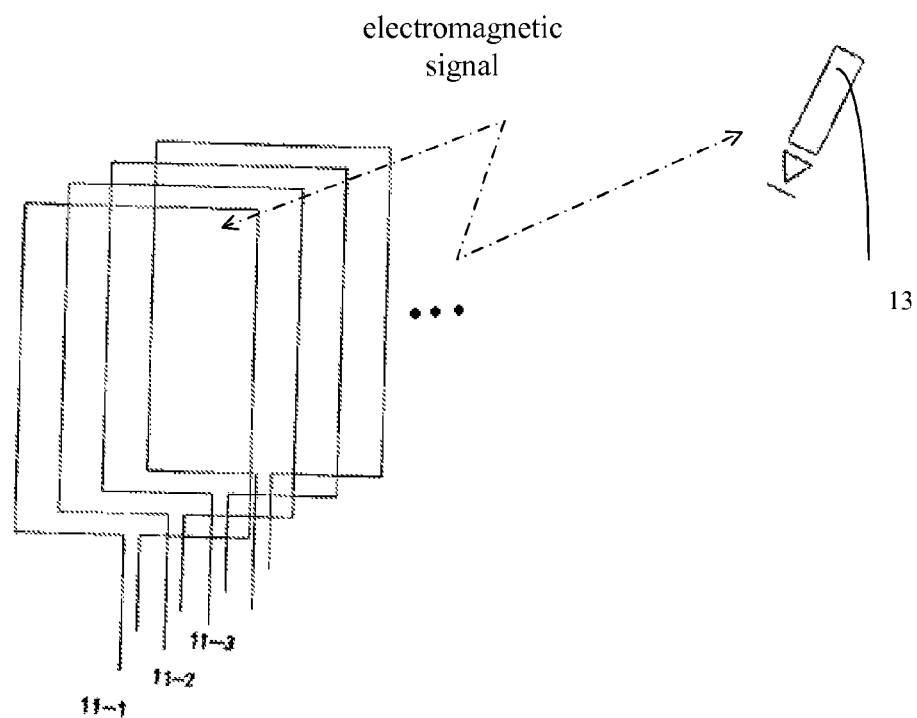
Figure 1C:
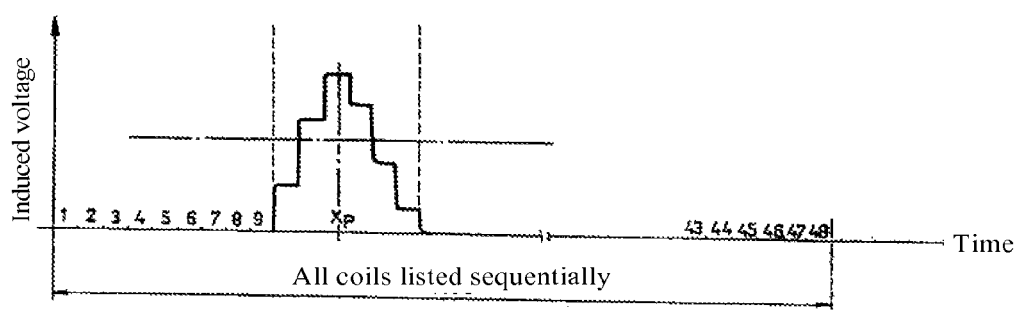
FIG. 1c is an diagram illustrating induced voltages detected from first coils shown in FIG. 1b.
Figure 2A:
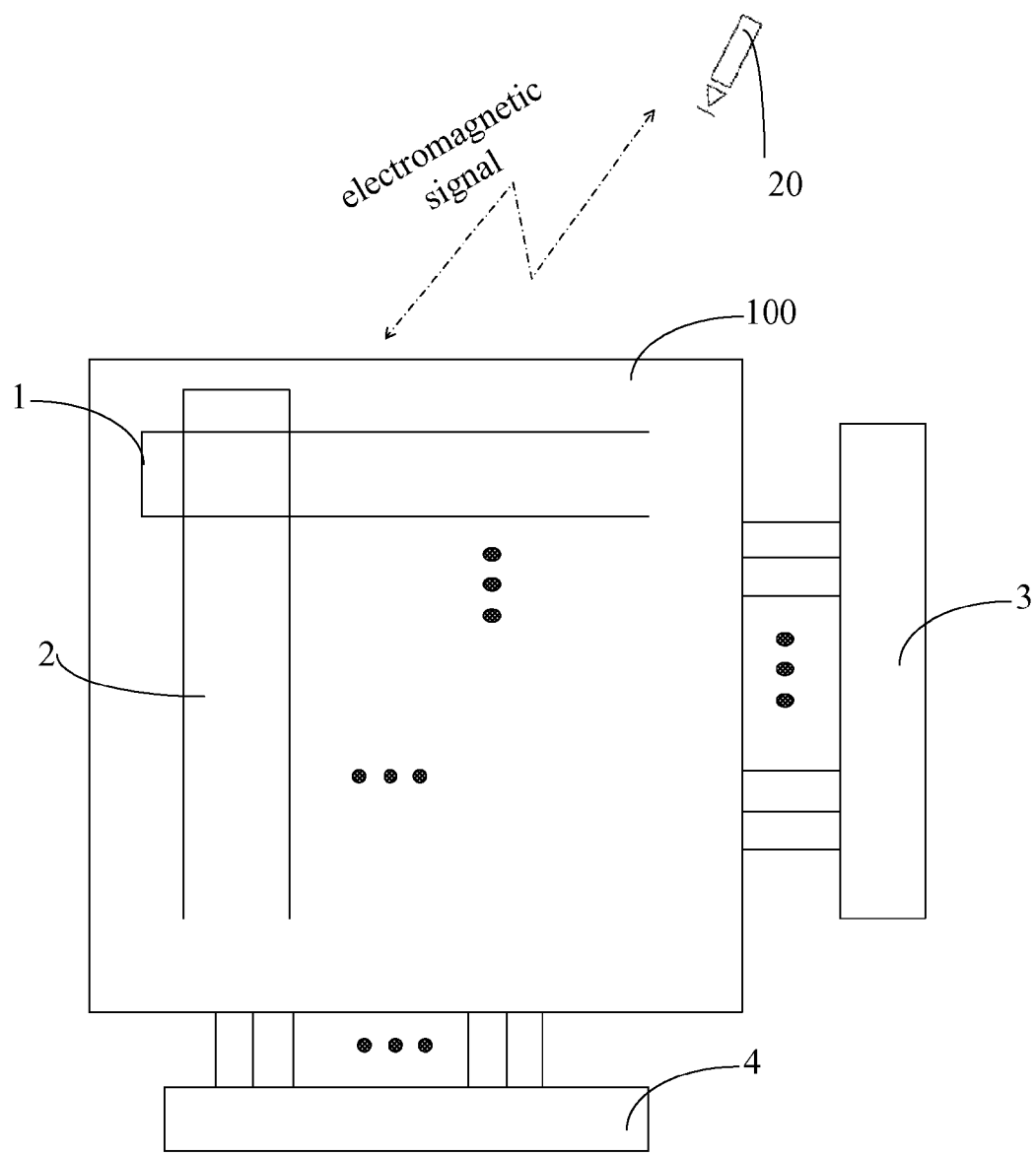
FIG. 2a is a structure block diagram of a coordinate input device according to an embodiment of the disclosure.

FIG. 2*a* is a structure diagram of a coordinate input device according to an embodiment of the disclosure. As showed in FIG. 2*a*, the coordinate input device includes an electromagnetic-type touch panel 10 and an electromagnetic stylus 20. The electromagnetic-type touch panel 10 mainly includes: a first substrate 100; a plurality of first coils 1 extending in a first direction (such as an X-direction) and a plurality of second coils 2 extending in a second direction (such as a Y-direction), provided on the first substrate 100; and a drive circuit 3 and a detection circuit 4 electrically connected with the first coils 1 and the second coils 2. Generally, the electromagnetic stylus 20 is passive, i.e., the electromagnetic stylus 20 does not need an extra power supply. Electromagnetic signals emitted by at least one of the first coils 1 and the second coils 2 are received by the electromagnetic stylus 20. Since generally there is a resonance circuit (such as an LC resonance circuit, which is not shown in FIG. 2*a*) in the electromagnetic stylus 20, the resonance circuit is excited by the received electromagnetic signals and accordingly generates electromagnetic signals having a same frequency as the electromagnetic signals emitted by at least one of the first coils 1 and the second coils 2 (a process that the electromagnetic stylus receives the electromagnetic signals and generates, through resonance, electromagnetic signals having the same frequency as the received electromagnetic signals is generally referred to as a process of reflecting the electromagnetic signals by the electromagnetic stylus). At least one of the first coils 1 and the second coils 2 generates induction signals (such as induced currents or induced voltages) after receiving the electromagnetic signals reflected by the electromagnetic stylus. The detection circuit 4 may calculate a coordinate of the touch position of the electromagnetic stylus based on the strength of the induction signal. The drive circuit 3 may provide a drive signal to at least one of the first coils 1 and the second coils 2, and the detection circuit 4 may detect the induction signals from at least one of the first coils 1 and the second coils 2. Electrical connections between the drive circuit 3, the detection circuit 4 and the first coils 1, the second coils 2 may vary with different methods for driving and detecting the touch panel.

A structure of the electromagnetic-type touch panel 10 and a method for driving and detecting the electromagnetic-type touch panel are detailed with examples hereinafter.

Figure 2B:
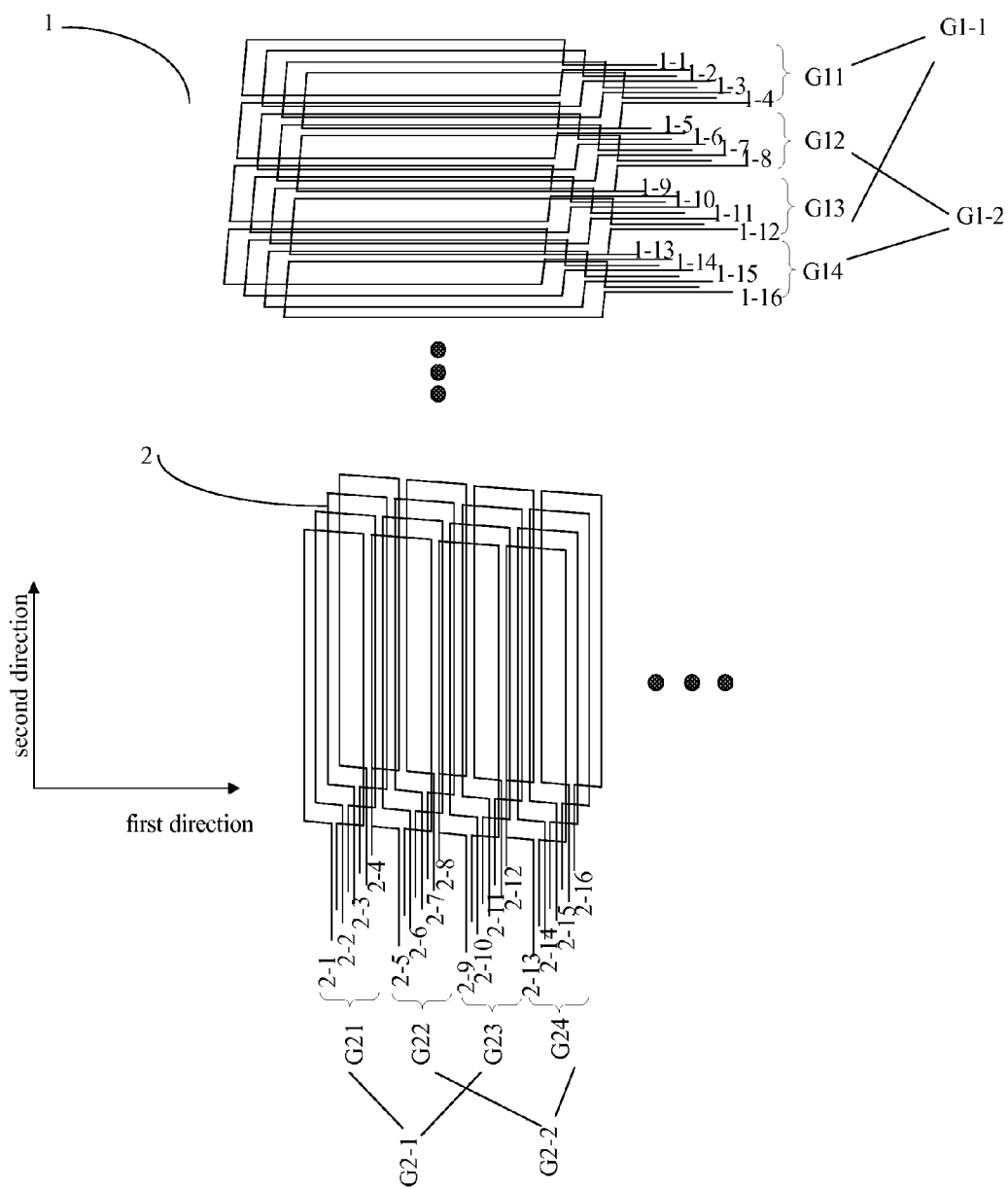
FIG. 2b is a schematic layout of first coils and second coils in an electromagnetic-type touch panel according to an embodiment of the disclosure.

FIG. 2*b* is a schematic layout of the first coils and the second coils of the electromagnetic-type touch panel according to the embodiment of the disclosure. As showed in FIG. 2*b*, in the electromagnetic-type touch panel 10, the first coils 1 includes a plurality of coils 1-1, 1-2, 1-3 . . . extending in the first direction (such as the X-direction) and arranged in the second direction (such as the Y-direction), and the second coils 2 includes a plurality of coils 2-1, 2-2, 2-3 . . . extending in the second direction (such as the Y-direction) and arranged in the first direction (such as the X-direction). Generally, the first coils 1 and the second coils 2 are crossed with each other (preferably, they are perpendicular to each other) and are insulated from each other. That is, the first direction and the second direction are crossed with each other (preferably, they are perpendicular to each other). It should be noted that, it is illustrated in the figure by taking a case that the first coils 1-1, 1-2, 1-3 . . . are arranged overlapping with adjacent first coils, and the second coils 2-1, 2-2, 2-3 . . . are arranged overlapping with adjacent second coils. Alternatively, the first coils 1-1, 1-2, 1-3 . . . may not be arranged overlapping with the adjacent first coils and the second coils 2-1, 2-2, 2-3 . . . may not be arranged overlapping with the adjacent second coils. Generally, the first coils 1 and the second coils 2 are looped.

As can be further seen from FIG. 2*b*, in the electromagnetic-type touch panel, the first coils 1 include a plurality of subgroups G11, G12, G13 . . . of first coils. Each subgroup of first coils includes at least one first coil. It should be noted that, it is illustrated in FIG. 2*b* by taking a case that each subgroup includes 4 coils as an example, where G11 includes the first coils 1-1, 1-2, 1-3 and 1-4, G12 includes the first coils 1-5, 1-6, 1-7 and 1-8, G13 includes the first coils 1-9, 1-10, 1-11 and 1-12, and G14 includes the first coils 1-13, 1-14, 1-15 and 1-16. Based on a core idea of the disclosure, those skilled in the art may understand that each subgroup of first coils may include only one first coil as a minimum, or may include a plurality of first coils; and the subgroups may include a same number of first coils or may include different numbers of first coils. In addition, the plurality of subgroups G11, G12, G13 . . . of first coils are grouped into a first group G1-1 of first coils and a second group G1-2 of first coils. G11, G12, G13, G14 . . . are arranged in sequence. It is illustrated in FIG. 2*b* by taking a case that the first group G1-1 of first coils includes odd-numbered subgroups, i.e., G11, G13 . . . , and the second group G1-2 of first coils includes even-numbered subgroups, i.e., G12, G14 . . . as an example. Alternatively, the first group G1-1 of first coils may include the even-numbered subgroups, i.e., G12, G14 . . . , and the second group G1-2 of first coils may include the odd-numbered subgroups, i.e., G11, G13 . . . . According to other embodiments of the disclosure, it is also illustrated by taking the case that the first group G1-1 of first coils includes the odd-numbered subgroups and the second group G1-2 of first coils includes the even-numbered subgroups as an example.

Similarly, the second coils 2 include a plurality of subgroups G21, G22, G23 . . . of second coils. Each subgroup of second coils includes at least one second coil. It should be noted that, it is illustrated in FIG. 2*b* by taking a case that each subgroup of second coils includes 4 coils as an example, where G21 includes the second coils 2-1, 2-2, 2-3 and 2-4, G22 includes the second coils 2-5, 2-6, 2-7 and 2-8, G23 includes second coils 2-9, 2-10, 2-11 and 2-12, and G24 includes second coils 2-13, 2-14, 2-15 and 2-16. Based on the core idea of the disclosure, those skilled in the art may understand that each subgroup of second coils may include only one second coil as a minimum, or may also include a plurality of second coils; and the subgroups may include a same number of second coils or may include different numbers of second coils. In addition, the plurality of subgroups G21, G22, G23 . . . of second coils are grouped into a first group G2-1 of second coils and a second group G2-2 of second coils. G21, G22, G23, G24 . . . are arranged in sequence. It is illustrated in FIG. 2b by taking a case that the first group G2-1 of second coils includes odd-numbered subgroups, i.e., G21, G23 . . . , and the second group G2-2 of second coils includes even-numbered subgroups, i.e., G22, G24 . . . as an example. Alternatively, the first group G2-1 of second coils may include the even-numbered subgroups, i.e., G22, G24 . . . , and the second group G2-2 of second coils may include the odd-numbered subgroups, i.e., G21, G23 . . . . According to other embodiments of the disclosure, it is also illustrated by taking the case that the first group G2-1 of second coils includes the odd-numbered subgroups and the second group G2-2 of second coils includes the even-numbered subgroups as an example.

A method for driving and detecting the electromagnetic-type touch panel is hereinafter illustrated based on the layout of the first coils and the second coils in the electromagnetic-type touch panel shown in FIG. 2b. In general, the method includes a preliminary detection and an accurate detection, and specifically, includes a preliminary detection for a first direction coordinate, an accurate detection for the first direction coordinate, a preliminary detection for a second direction coordinate and an accurate detection for the second direction coordinate.

The first direction coordinate of a touch position of the electromagnetic stylus is obtained based on the induction signals of the second coils extending in the second direction, and the second direction coordinate of the touch position of the electromagnetic stylus is obtained based on induction signals of the first coils extending in the first direction. The first direction coordinate of the touch position of the electromagnetic stylus is obtained through 2 steps of detection. Firstly, a preliminary value of the first direction coordinate is obtained by preliminarily detecting the induction signals of the second coils (i.e., the preliminary detection for the first direction coordinate is performed); and secondly, an accurate value of the first direction coordinate is obtained by accurately detecting the induction signals from the second coils (i.e., the accurate detection for the first direction coordinate is performed). Similarly, the second direction coordinate for the touch position of the electromagnetic stylus may also be obtained through 2 steps of detection. Firstly, a preliminary value of the second direction coordinate is obtained by preliminarily detecting the induction signals from the first coils (i.e., the preliminary detection for the second direction coordinate is performed); and secondly, an accurate value of the second direction coordinate is obtained by accurately detecting the induction signals from the first coils (i.e., the accurate detection for the second direction coordinate is performed).

Different implementations for the method are described as follows.

In an implementation, the following steps P1-P4 are performed in sequence.

In the step P1, the preliminary detection for the second direction coordinate is performed.

Figure 3:
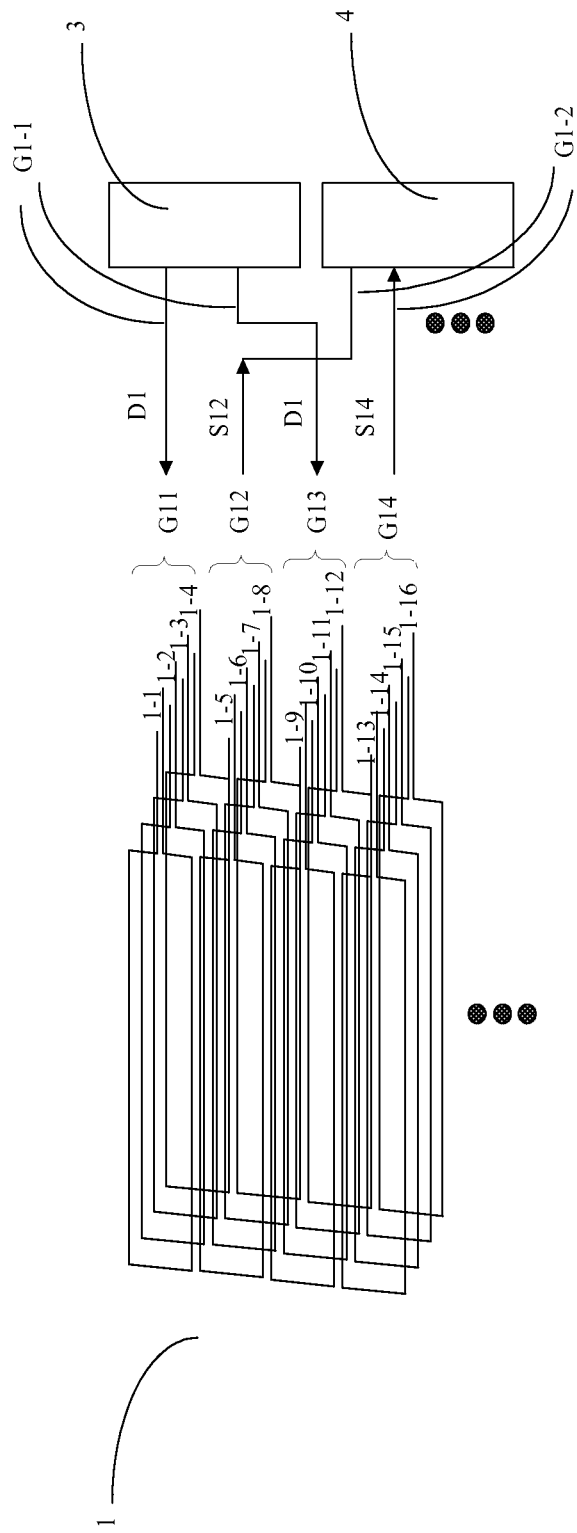
FIG. 3 is a diagram showing a principle of a preliminary detection for a second direction coordinate according to an embodiment of the disclosure.

As shown in FIG. 3, a drive signal is simultaneously applied to the first group G1-1 of first coils and the first group G1-1 of first coils emit electromagnetic signals. First induction signals S1 (including S12, S14 . . . ) from the second group G1-2 of first coils are detected. The preliminary value of the second direction coordinate for the touch position of the electromagnetic stylus is determined based on the first induction signals S1.

The drive circuit 3 simultaneously applies the drive signal D1 to each subgroup of first coils (G11, G13 . . . ) in the first group G1-1 of first coils. The detection circuit 4 detects the first induction signals (S12, S14 . . . ) respectively from the subgroups of first coils (G12, G14 . . . ) in the second group G1-2 of first coils. There is a one-to-one correspondence between the first induction signals and the individual subgroups of first coils in the second group G1-2 of first coils. For example, the detection circuit 4 detects S12 from G12, detects S14 from G14, and so on. The first induction signals from the individual subgroups of first coils (G12, G14 . . . ) in the second group G1-2 of first coils may be detected simultaneously, or may be detected subgroup by subgroup. A process of applying the drive signal to the first group G1-1 of first coils and making the first group G1-1 of first coils emit the electromagnetic signals and a process of detecting the first induction signals from the second group G1-2 of first coils may be performed simultaneously or in a time division mode.

Figure 4A:
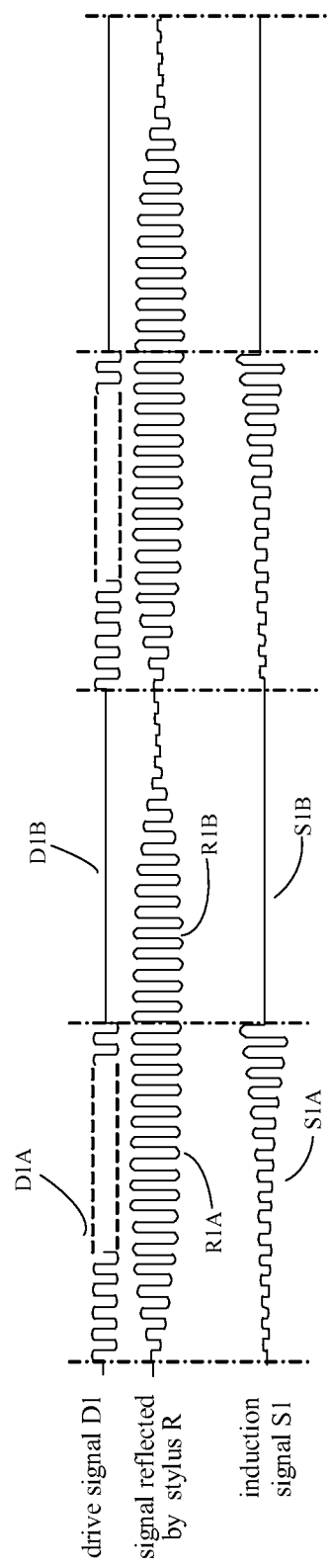
FIG. 4a illustrates signal waveforms in a case that a process of emitting electromagnetic signals by a first group of first coils and a process of detecting induction signals from a second group of first coils are performed simultaneously according to an embodiment of the disclosure.

In the case that the process of applying the drive signal to the first group G1-1 of first coils and making the first group G1-1 of first coils emit the electromagnetic signals and the process of detecting the first induction signals from the second group G1-2 of first coils are performed simultaneously, the detected induction signals need to be processed. As shown in FIG. 4a, the drive signal D1 (corresponding to a signal D1A shown in FIG. 4a) is applied by the drive circuit to the first group G1-1 of first coils. The drive signal D1 may be applied once or multiple times, where there is a time interval between two applications of the drive signal (during the time interval the drive signal may be regarded as D1B as shown in FIG. 4a). When the drive signal D1 is applied by the drive circuit to the first group G1-1 of first coils, the electromagnetic stylus is excited to generate a gradually enhanced electromagnetic signal R1A. When the drive signal D1 is not applied by the drive circuit to the first group G1-1 of first coils, the electromagnetic stylus is excited to generate a gradually damped electromagnetic signal R1B. When the drive signal D1 is applied by the drive circuit to the first group G1-1 of first coils, an induction signal S1A detected by the detection circuit from the second group G1-2 of first coils is a result due to a combination of D1A and R1A. To improve a detection accuracy, an induction signal S1A' generated by the second group G1-2 of first coils due to only the drive signal D1 should be detected in advance. Then, in a working process of the touch panel, S1A' is removed from the induction signal S1A, which is detected from the second group G1-2 of first coils when the drive signal is applied to the first group G1-1 of first coils, to obtain an induction signal generated by the second group G1-2 of first coils due to an excitation of the second group G1-2 of first coils caused by the electromagnetic signals emitted by the electromagnetic stylus.

Figure 4B:
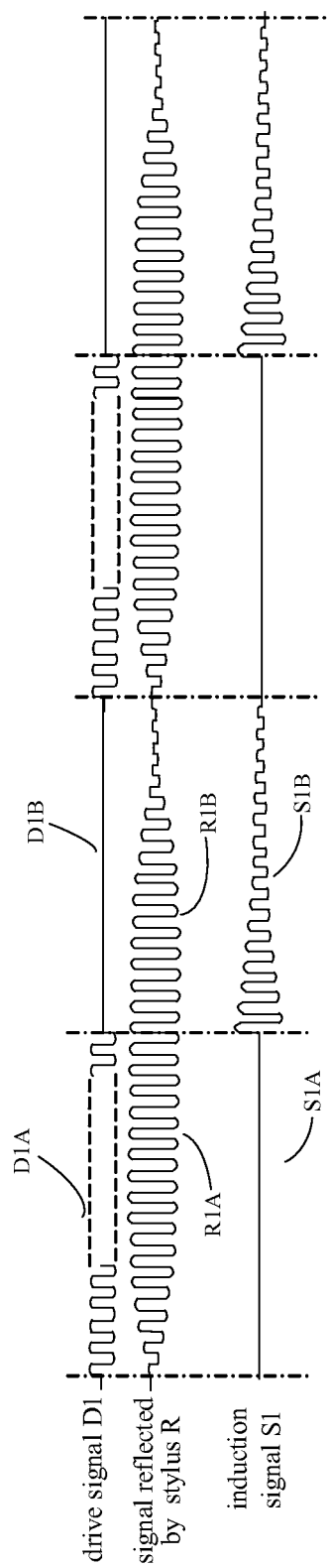
FIG. 4b illustrates signal waveforms in a case that a process of emitting electromagnetic signals by a first group of first coils and a process of detecting induction signals from a second group of first coils are performed in a time division mode according to an embodiment of the disclosure.

In the case that the process of applying the drive signal to the first group G1-1 of first coils and making the first group G1-1 of first coils emit the electromagnetic signals and the process of detecting the first induction signals from the second group G1-2 of first coils are performed in the time division mode, a corresponding design needs to be made on the detection circuit, or the detected induction signals need to be processed. As shown in FIG. 4b, the drive signal D1 (corresponding to a signal D1A) is applied by the drive circuit to the first group G1-1 of first coils. The drive signal D1 may be applied once or multiple times, and there is a time interval between two applications of the drive signal (during the time interval the drive signal may be regarded as a signal D1B as shown in FIG. 4b). When the drive signal D1 is applied by the drive circuit to the first group G1-1 of first coils, the electromagnetic stylus is excited to generate a gradually enhanced electromagnetic signal R1A. When the drive signal D1 is not applied by the drive circuit to the first group G1-1 of first coils, the electromagnetic stylus is excited to generate a gradually damped electromagnetic signal R1B. When the drive signal D1 is not applied by the drive circuit to the first group G1-1 of first coils, an induction signal S1B detected by the detection circuit from the second group G1-2 of first coils is a result due to an excitation caused by the electromagnetic signal R1B emitted by the electromagnetic stylus. In FIG. 4b, when the drive signal D1 is applied to the first group G1-1 of first coils, an induction signal S1A detected from the second group G1-2 of first coils is zero. In fact, when the drive signal D1 is applied to the first group G1-1 of first coils, D1A and R1A may have a combined effect on the second group G1-2 of first coils, and an electromagnetic induction signal same as S1A shown in FIG. 4a is generated. Since the electromagnetic induction signal same as S1A shown in FIG. 4a is not due to only the electromagnetic signals emitted by the electromagnetic stylus, the structure of the detection circuit may be changed or the induction signal detected when the drive signal D1 is applied to the first group G1-1 of first coils may be removed.

Figure 5A:
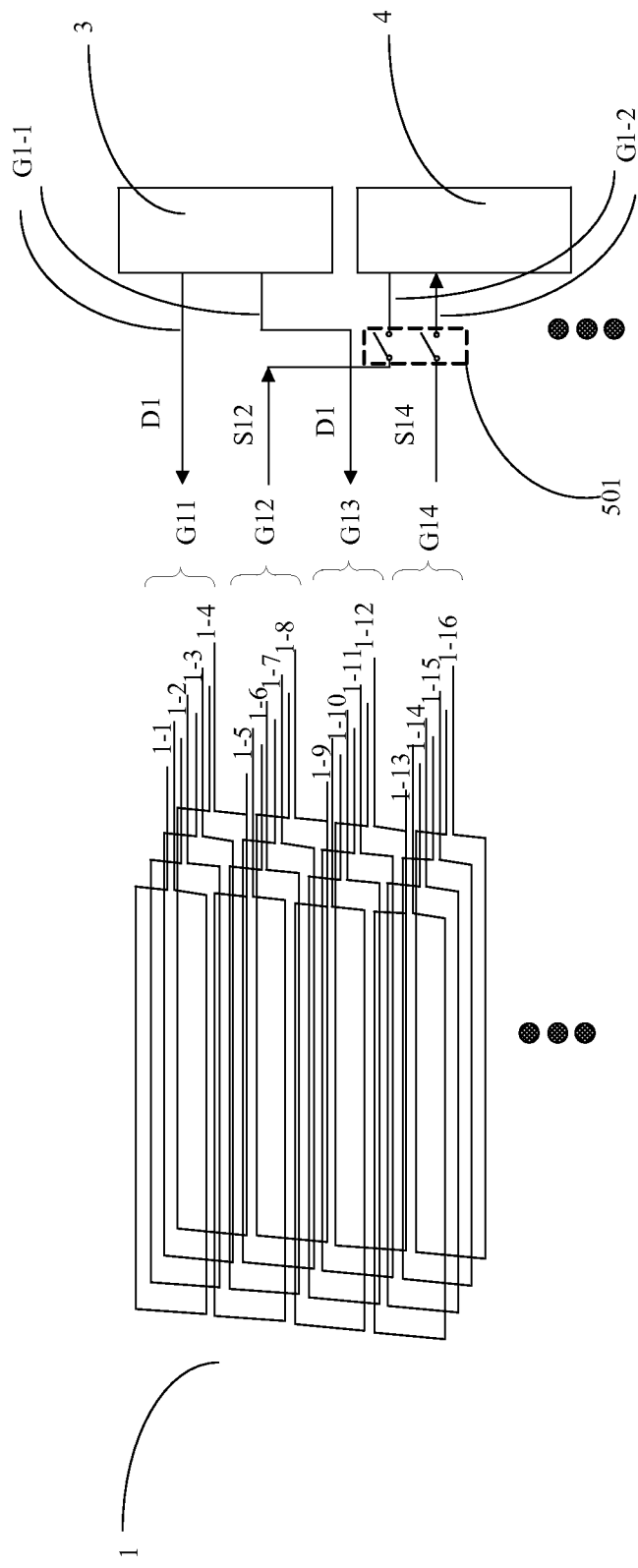
FIG. 5a is a diagram showing a principle of a preliminary detection for a second direction coordinate performed with a first selection switch unit according to an embodiment of the disclosure.

As shown in FIG. 5a, based on the structure shown in FIG. 3, a first selection switch unit 501 is added to the electromagnetic-type touch panel, to control a time period during which the detection circuit 4 detects the induction signals from the second group G1-2 of first coils. Same parts as those in FIG. 3 are not repeated here. As showed in FIG. 5a, the electromagnetic-type touch panel further includes the first selection switch unit 501 provided between the second group G1-2 of first coils and the detection circuit 4. The first selection switch unit 501 is off when the first group G1-1 of first coils emit the electromagnetic signals, and the first selection switch unit 501 is on when the first group G1-1 of first coils does not emit the electromagnetic signals. The first selection switch unit 501 may include a plurality of switches, each switch is electrically connected with one subgroup of first coils in the second group G1-2 of first coils. The switches may be turned on or turned off simultaneously, or they may be turned on in sequence.

Figure 5B:
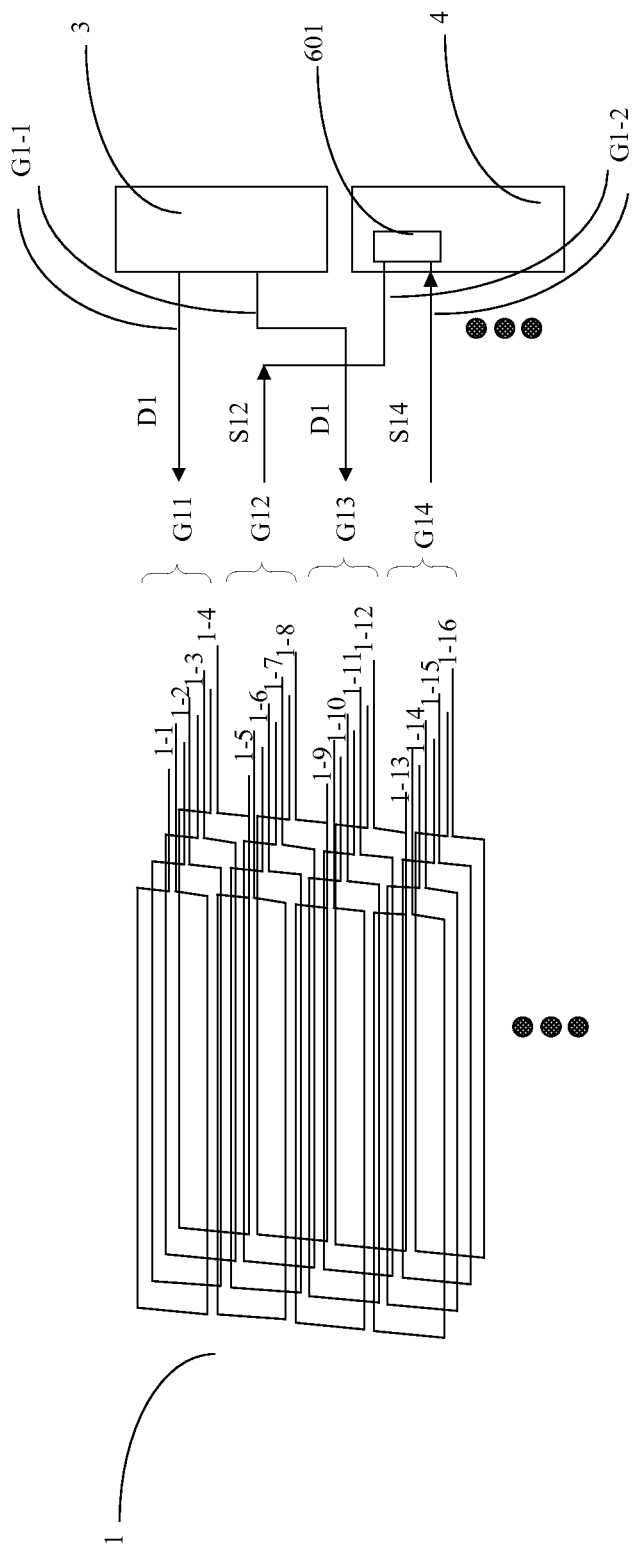
FIG. 5b is a diagram showing a principle of a preliminary detection for a second direction coordinate performed with a first signal filtering unit according to an embodiment of the disclosure.

As shown in FIG. 5b, based on the structure of the electromagnetic-type touch panel shown in FIG. 3, a first signal filtering unit 601 is added in the detection circuit 4. Same parts as those in FIG. 3 are not repeated here. As showed in FIG. 5b, the detection circuit 4 further includes the first signal filtering unit 601 for removing the signal received, when the first group G1-1 of first coils emit the electromagnetic signals, from the second group G1-2 of first coils.

Figure 6:
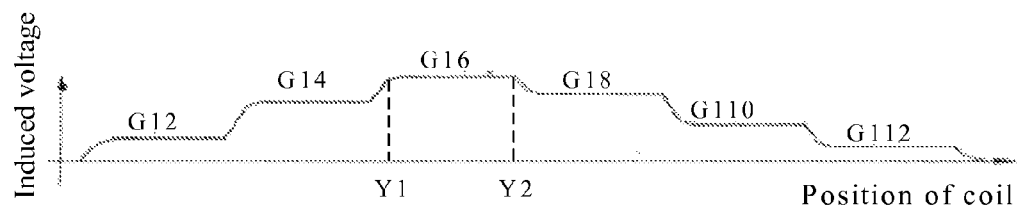
FIG. 6 illustrates induced voltages detected from a second group of first coils shown in FIG. 3.

In addition, there may be many different implementations for the detection circuit 4 to determine the preliminary value of the second direction coordinate of the touch position of the electromagnetic stylus based on the first induction signals. An implementation is illustrated hereinafter in conjunction with FIG. 6. As shown in FIG. 6, the detection circuit 4 detects one induction signal (which is shown as an induced voltage in FIG. 6) from each subgroup of first coils in the second group G1-2 of first coils. The detection circuit 4 selects a position of one subgroup of first coils generating a maximum first induction signal among these first induction signals as the preliminary value of the second direction coordinate of the touch position of the electromagnetic stylus. For example, as shown in FIG. 6, subgroup G16 in the second group G1-2 of first coils generates the maximum first induction signal. Consequently, the position of subgroup G16 is selected as the preliminary value of the second direction coordinate of the touch position of the electromagnetic stylus. The position of subgroup G16 refers to a position where subgroup G16 is arranged in the second direction, which may be a coordinate range from Y1 to Y2 occupied by subgroup G16 in the second direction or may be a value within the coordinate range from Y1 to Y2, such as (Y1+Y2)/2.

With the step P1, an approximate touch position of the electromagnetic stylus in the second direction may be quickly determined through emitting the electromagnetic signals only once and receiving the electromagnetic signals only once.

In the step P2, the preliminary detection for the first direction coordinate is performed.

In the preliminary detection for the first direction coordinate, the electromagnetic signals received by the electromagnetic stylus may be from the first coils or the second coils. The two different cases are respectively illustrated hereinafter.

In a step P2-1, the drive signal is applied simultaneously to at least one of the first group G1-1 of first coils and the second group G1-2 of first coils, and at least one of the first group G1-1 of first coils and the second group G1-2 of first coils emits the electromagnetic signals. Second induction signals S2 are detected from at least one of the first group G2-1 of second coils and the second group G2-2 of second coils. The preliminary value of the first direction coordinate of the touch position of the electromagnetic stylus is determined based on the second induction signals S2.

In the step P2-1, the electromagnetic signals may be simultaneously emitted by the first group G1-1 of first coils. In this case, emitting the electromagnetic signals by the first group G1-1 of first coils in the step P2-1 may be a same process of emitting the electromagnetic signals by the first group G1-1 of first coils in step P1. Accordingly, a process of detecting the second induction signals S2 from at least one of the first group G2-1 of second coils and the second group G2-2 of second coils in the step P2-1 and the process of detecting the first induction signals S1 from the second group G1-2 of first coils in the step P1 may be performed simultaneously. In this way, the detection efficiency may be further improved. Alternatively, the emitting the electromagnetic signals by the first group G1-1 of first coils in step P2-1 may be a different process from that of emitting the electromagnetic signals by the first group G1-1 of first coils in the step P1, that is, a time division emitting is used. In this case, the drive circuit 3 provides drive signals to the first group G1-1 of first coils twice.

Alternatively, in the step P2-1, the electromagnetic signals may be simultaneously emitted by the second group G1-2 of first coils. In this case, in the electromagnetic-type touch panel, the drive circuit is electrically connected with the second group G1-2 of first coils, and the drive circuit provides the drive signal to the second group G1-2 of first coils in step the P2-1. In addition, in the step P2-1, the electromagnetic signals may be simultaneously emitted by the first group G1-1 of first coils and the second group G1-2 of first coils (i.e., all the first coils). In this case, in the electromagnetic-type touch panel, the drive circuit is electrically connected with the first group G1-1 of first coils and the second group G1-2 of first coils, and the drive circuit provides drive signals to the first group G1-1 of first coils and the second group G1-2 of first coils in the step P2-1.

After the drive signal is applied simultaneously to at least one of the first group G1-1 of first coils and the second group G1-2 of first coils and at least one of the first group G1-1 of first coils and the second group G1-2 of first coils emits the electromagnetic signals, the electromagnetic signals excite the electromagnetic stylus to resonate to generate electromagnetic signals. Due to the electromagnetic signals generated by the electromagnetic stylus through resonance, at least one of the first group G2-1 of second coils and the second group G2-2 of second coils generates the second induction signals S2. The second induction signals S2 may be generated by the first group G2-1 of second coils. In this case, in the electromagnetic-type touch panel, the detection circuit is electrically connected with the first group G2-1 of second coils, and the detection circuit detects the second induction signals from the first group G2-1 of second coils. Alternatively, the second induction signals S2 may be generated by the second group G2-2 of second coils. In this case, in the electromagnetic-type touch panel, the detection circuit is electrically connected with the second group G2-2 of second coils, and the detection circuit detects the second induction signals from the second group G2-2 of second coils. In addition, the second induction signals S2 may be generated by the first group G2-1 of second coils and the second group G2-2 of second coils (i.e., all the second coils). In this case, in the electromagnetic-type touch panel, the detection circuit is electrically connected with the first group G2-1 of second coils and the second group G2-2 of second coils, and the detection circuit detects the second induction signals from the first group G2-1 of second coils and the second group G2-2 of second coils.

It should be noted that, in the step P2-1, the process of applying the drive signal simultaneously to at least one of the first group G1-1 of first coils and the second group G1-2 of first coils and making at least one of the first group G1-1 of first coils and the second group G1-2 of first coils emit the electromagnetic signals and the process of detecting the second induction signals from at least one of the first group G2-1 of second coils and the second group G2-2 of second coils may be performed simultaneously or in a time division mode. The second induction signals may be simultaneously detected from the individual subgroups of second coils in at least one of the first group G2-1 of second coils and the second group G2-2 of second coils, or the second induction signals may be detected subgroup by subgroup.

Figure 7A:
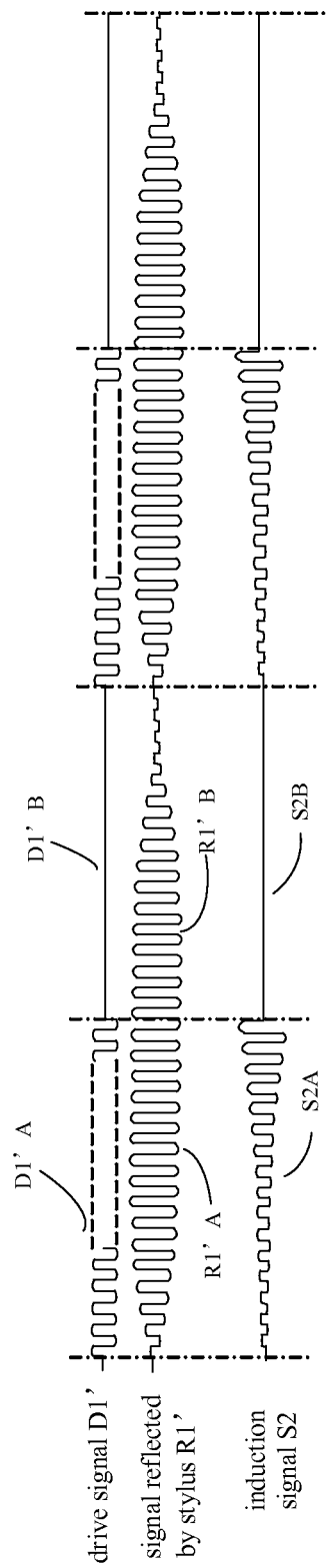
FIG. 7a illustrates signal waveforms in a case that a process of emitting electromagnetic signals by at least one of a first group of first coils and a second group of first coils and a process of detecting induction signals from at least one of a first group of second coils and a second group of second coils are performed simultaneously according to an embodiment of the disclosure.

In the case that the process of applying the drive signal simultaneously to at least one of the first group G1-1 of first coils and the second group G1-2 of first coils and making at least one of the first group G1-1 of first coils and the second group G1-2 of first coils emit the electromagnetic signals and the process of detecting the second induction signals from at least one of the first group G2-1 of second coils and the second group G2-2 of second coils are performed simultaneously, the detected induction signals need to be processed. A processing is similar to that described in conjunction with FIG. 4a. As shown in FIG. 7a, a drive signal D1' (corresponding to a signal D1'A shown in FIG. 7a) is applied by the drive circuit to at least one of the first group G1-1 of first coils and the second group G1-2 of first coils. The drive signal D1' may be applied once or multiple times, and there is a time interval between two applications of the drive signal (during the time interval the drive signal may be regarded as D1'B as shown in FIG. 7a). When the drive signal D1' is applied by the drive circuit to at least one of the first group G1-1 of first coils and the second group G1-2 of first coils, the electromagnetic stylus is excited to generate a gradually enhanced electromagnetic signal R1'A. When the drive signal D1' is not applied by the drive circuit to at least one of the first group G1-1 of first coils and the second group G1-2 of first coils, the electromagnetic stylus is excited to generate a gradually damped electromagnetic signal R1'B. When the drive signal D1' is applied by the drive circuit to at least one of the first group G1-1 of first coils and the second group G1-2 of first coils, an induction signal S2A detected by the detection circuit from at least one of the first group G2-1 of second coils and the second group G2-2 of second coils is a result due to a combination of D1'A and R1'A. To improve the detection accuracy, an induction signal S2A' generated by at least one of the first group G2-1 of second coils and the second group G2-2 of second coils due to only the drive signal D1' should be detected in advance. Then, in a working process of the touch panel, S2A' is removed from the induction signal S2A, which is detected from at least one of the first group G2-1 of second coils and the second group G2-2 of second coils when the drive signal is applied to at least one of the first group G1-1 of first coils and the second group G1-2 of first coils, to obtain an induction signal generated by at least one of the first group G2-1 of second coils and the second group G2-2 of second coils due to an excitation caused by the electromagnetic signals emitted by the electromagnetic stylus.

Figure 7B:
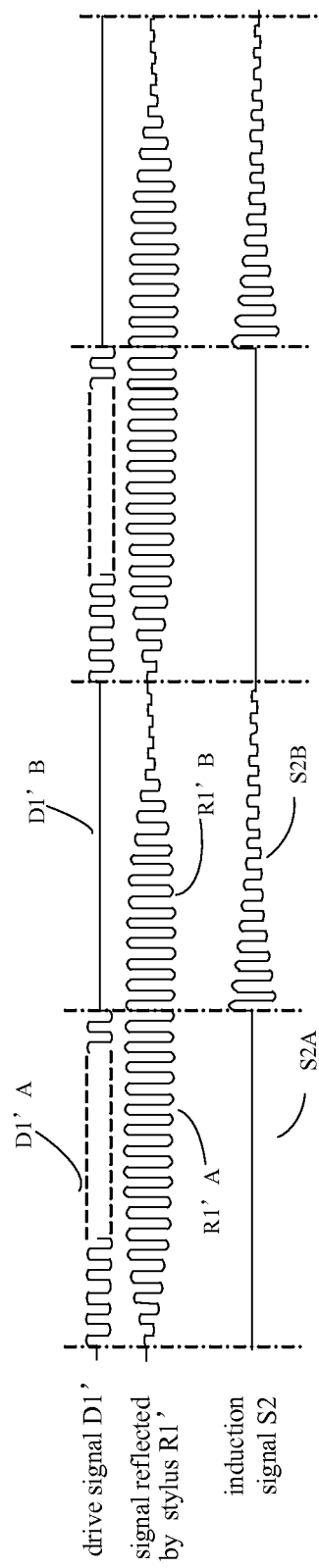
FIG. 7b illustrates signal waveforms in a case that a process of emitting electromagnetic signals by at least one of a first group of first coils and a second group of first coils and a process of detecting induction signals from a first group of second coils or a second group of second coils are performed in a time division mode according to an embodiment of the disclosure.
Figure 8A:
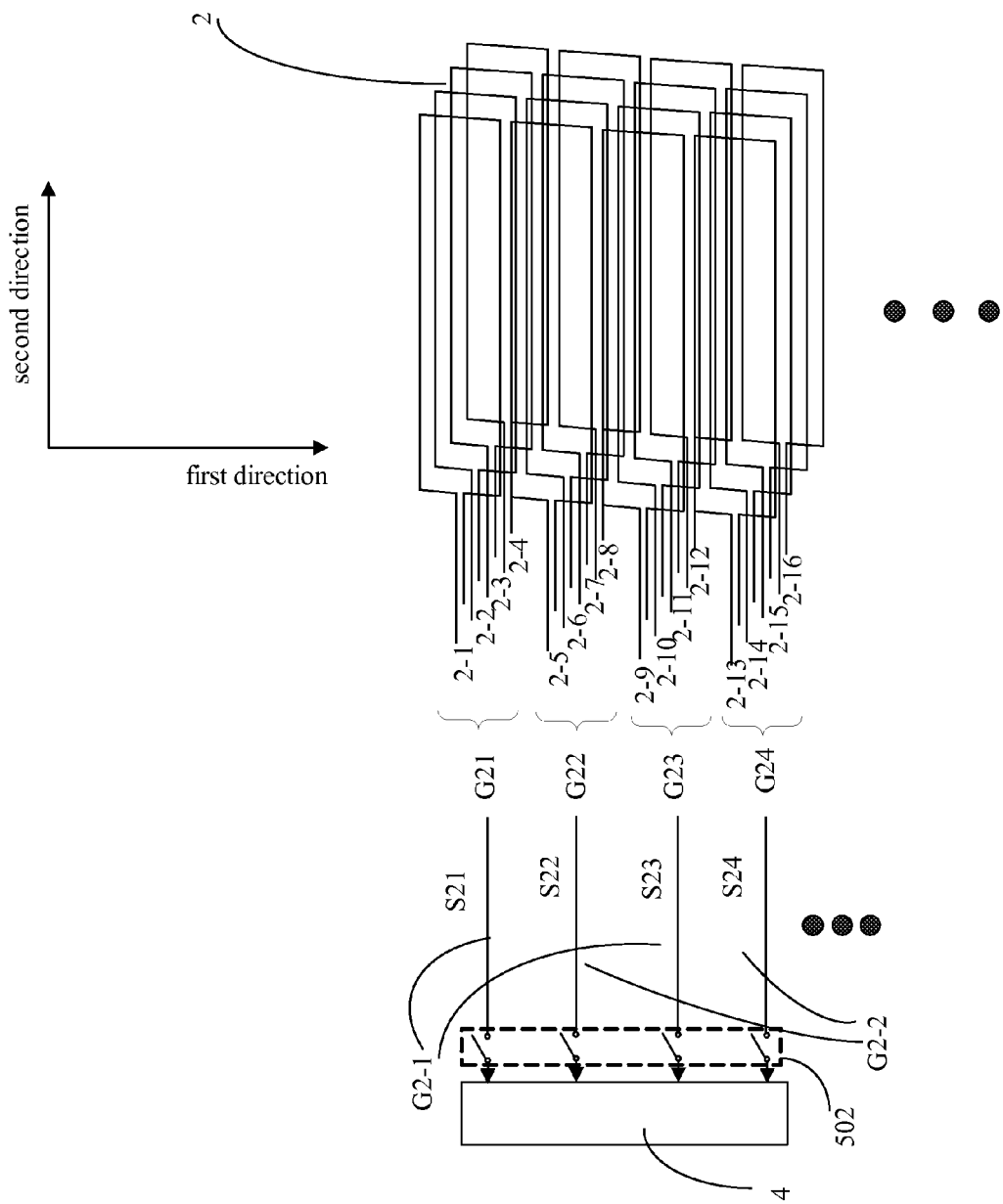
FIG. 8a is a diagram showing a principle of a preliminary detection for a first direction coordinate performed with a second selection switch unit according to an embodiment of the disclosure.
Figure 8B:
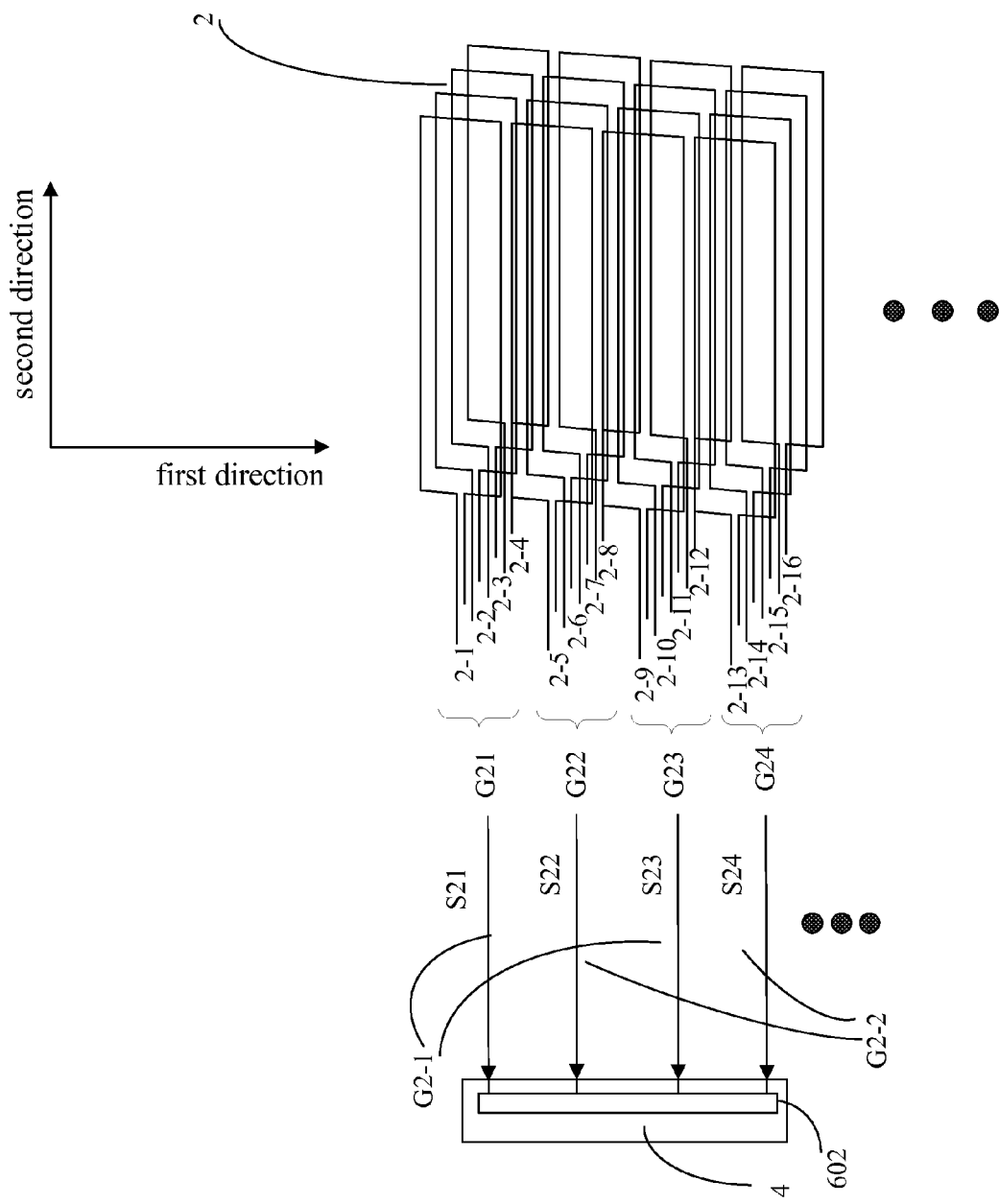
FIG. 8b is a diagram showing a principle of a preliminary detection for a first direction coordinate performed with a second signal filtering unit according to an embodiment of the disclosure.

In the case that the process of applying the drive signal simultaneously to at least one of the first group G1-1 of first coils and the second group G1-2 of first coils and making at least one of the first group G1-1 of first coils and the second group G1-2 of first coils emit the electromagnetic signals and the process of detecting the second induction signals from the first group G2-1 of second coils or the second group G2-2 of second coils are performed in the time division mode, a corresponding design needs to be made on the detection circuit, or the detected induction signals need to be processed. As shown in FIG. 7b, a drive signal D1' (corresponding to a signal D1'A) is applied by the drive circuit to at least one of the first group G1-1 of first coils and the second group G1-2 of first coils. The drive signal D1' may be applied once or multiple times, and there is a time interval between two applications of the drive signal (during the time interval the drive signal may be regarded as a signal D1'B as shown in FIG. 7b). When the drive signal D1' is applied by the drive circuit to the first group G1-1 of at least one of first coils and the second group G1-2 of first coils, the electromagnetic stylus is excited to generate a gradually enhanced electromagnetic signal R1'A. Then when the drive signal D1' is not applied by the drive circuit to at least one of the first group G1-1 of first coils and the second group G1-2 of first coils, the electromagnetic stylus is excited to generate a gradually damped electromagnetic signal R1'B. When the drive signal D1' is not applied by the drive circuit to at least one of the first group G1-1 of first coils and the second group G1-2 of first coils, an induction signal S2B detected by the detection circuit from at least one of the first group G2-1 of second coils and the second group G2-2 of second coils is a result due to an excitation caused by the electromagnetic signal R1'B emitted by the electromagnetic stylus. In FIG. 7b, when the drive signal D1' is applied to at least one of the first group G1-1 of first coils and the second group G1-2 of first coils, an induction signal S2A detected from at least one of the first group G2-1 of second coils and the second group G2-2 of second coils is zero. In fact, when the drive signal D1' is applied to at least one of the first group G1-1 of first coils and the second group G1-2 of first coils, the D1'A and R1'A have a combined effect on at least one of the first group G2-1 of second coils and the second group G2-2 of second coils, and an electromagnetic induction signal same as S2A shown in FIG. 7a is generated. Since the electromagnetic induction signal same as S2A shown in FIG. 7a is not due to only the electromagnetic signals emitted by the electromagnetic stylus, the structure of the detection circuit may be changed or the induction signal detected when the drive signal D1' is applied to at least one of the first group G1-1 of first coils and the second group G1-2 of first coils may be removed. For example, in the electromagnetic-type touch panel, a second selection switch unit 502 provided between at least one of the first group G2-1 of second coils and the second group G2-2 of second coils, and the detection circuit 4 may be added (as shown in FIG. 8a, it is illustrated by taking a case that both the first group G2-1 of second coils and the second group G2-2 of second coils generate the induction signals as an example). The second selection switch unit 502 is off when at least one of the first group G1-1 of first coils and the second group G1-2 of first coils emits the electromagnetic signals, and the second selection switch unit 502 is on when at least one of the first group G1-1 of first coils and the second group G1-2 of first coils does not emit the electromagnetic signals. Alternatively, the detection circuit 4 further includes a second signal filtering unit 602 (as shown in FIG. 8b, it is illustrated by taking a case that both the first group G2-1 of second coils and the second group G2-2 of second coils generate the induction signals as an example), to remove the signal received from at least one of the first group G2-1 of second coils and the second group G2-2 of second coils when at least one of the first group G1-1 of first coils and the second group G1-2 of first coils emits the electromagnetic signals.

Figure 9:
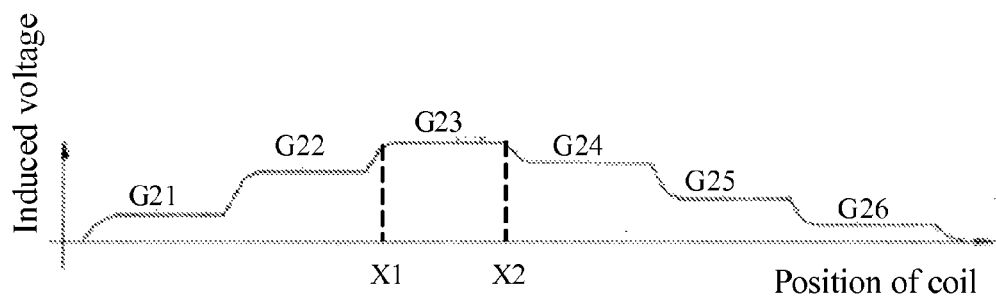
FIG. 9 illustrates induced voltages detected from the first group of second coils and the second group of second coils shown in FIG. 8a or FIG. 8b.

In addition, there may be many different implementations for the detection circuit 4 to determine the preliminary value of the first direction coordinate of the touch position of the electromagnetic stylus based on the second induction signals. An implementation is illustrated hereinafter in conjunction with FIG. 9. As shown in FIG. 9, the detection circuit 4 detects one induction signal (which is shown as an induced voltage in FIG. 9) from each subgroup of second coils in at least one of the first group G2-1 of second coils and the second group G2-2 of second coils. The detection circuit 4 selects a position of one subgroup of second coils generating a maximum second induction signal among the second induction signals as the preliminary value of the first direction coordinate of the touch position of the electromagnetic stylus. For example, as shown in FIG. 9, subgroup G23 generates the maximum second induction signal. Consequently, the position of subgroup G23 is selected as the preliminary value of the first direction coordinate of the touch position of the electromagnetic stylus. The position of subgroup G23 refers to a position where subgroup G23 is arranged in the first direction, which may be a coordinate range from X1 to X2 occupied by subgroup G23 in the first direction or may be a value within the coordinate range from X1 to X2, such as (X1+X2)/2.

With the step P2-1, an approximate touch position the electromagnetic stylus in the first direction may be quickly determined through emitting the electromagnetic signals only once and receiving the electromagnetic signals only once.

In the step P2-1, the electromagnetic signals received by the electromagnetic stylus may be from the first coils. In the following step P2-2, the electromagnetic signals received by the electromagnetic stylus may be from the second coils.

In the step P2-2, the drive signal is applied simultaneously to the first group G2-1 of second coils and the first group G2-1 of second coils emit electromagnetic signals. Second induction signals S2 are detected from the second group G2-2 of second coils, and the preliminary value of the first direction coordinate of the touch position of the electromagnetic stylus is determined based on the second induction signals S2.

The step P2-2 may be referred to the step P1. In the step P1, the preliminary value of the second direction coordinate of the touch position of the electromagnetic stylus is determined by driving and detecting the first coils extending in the first direction and arranged in the second direction. In step P2-2, the preliminary value of the first direction coordinate of the touch position of the electromagnetic stylus is determined by driving and detecting the second coils extending in the second direction and arranged in the first direction. Principles and approaches for driving and detecting in the steps P1 and P2-2 are the same. The step P2-2 is illustrated simply hereinafter.

Figure 10:
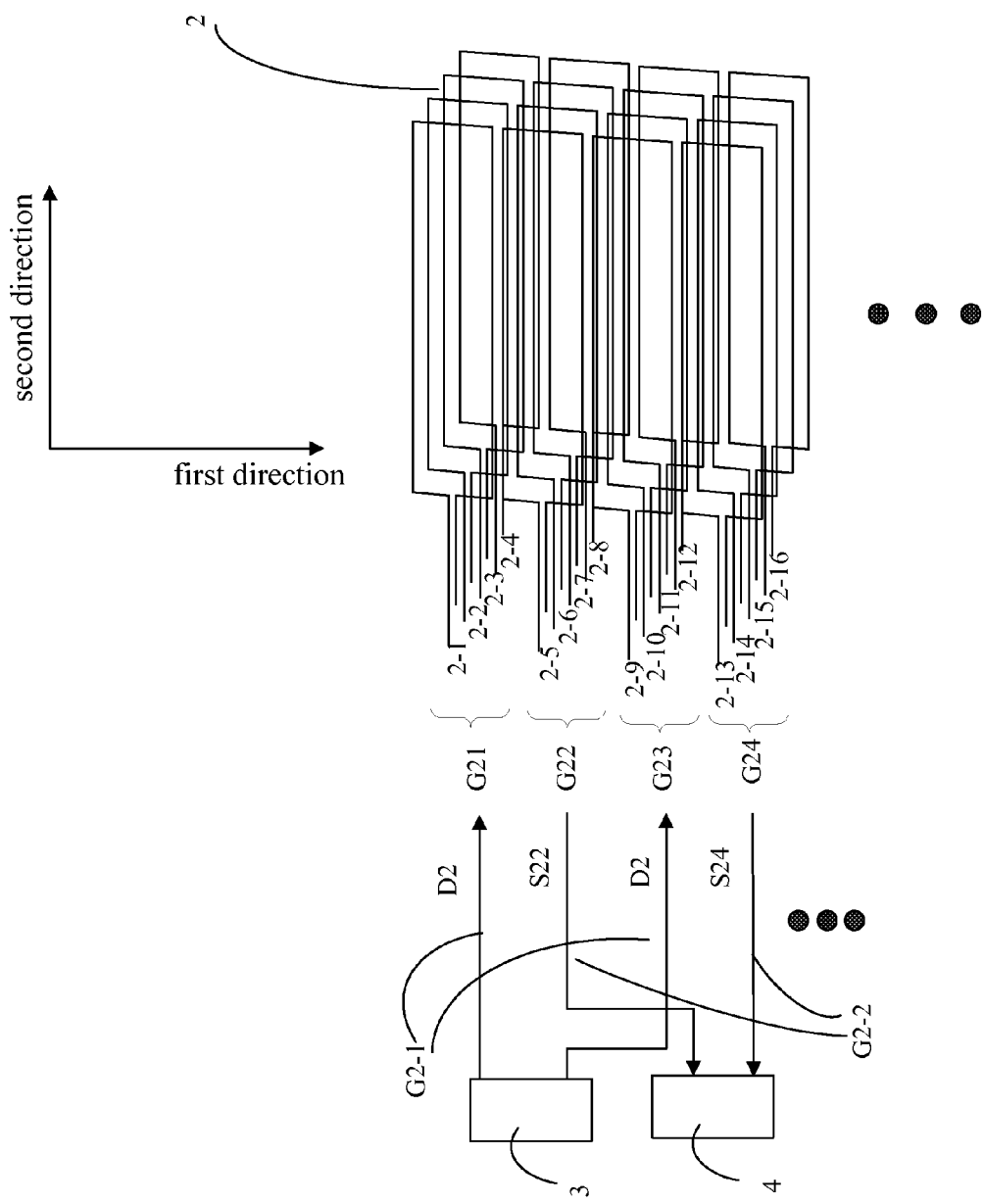
FIG. 10 is a diagram showing a principle of a preliminary detection for a first direction coordinate according to an embodiment of the disclosure.

As shown in FIG. 10, the drive signal D2 is applied simultaneously to the first group G2-1 of second coils and the first group G2-1 of second coils emit electromagnetic signals. Second induction signals S2 (including S22, S24 . . . ) from the second group G2-2 of second coils are detected. The preliminary value of the first direction coordinate of the touch position of the electromagnetic stylus is determined based on the second induction signals S2.

The drive circuit 3 simultaneously applies the drive signals D2 to each subgroup of second coils (G21, G23 . . . ) in the first group G2-1 of second coils. The detection circuit 4 detects the second induction signals (S22, S24 . . . ) respectively from the subgroups of second coils (G22, G24 . . . ) in the second group G2-2 of second coils. There is a one-to-one correspondence between the second induction signals and the individual subgroups of second coils in the second group G2-2 of second coils. For example, the detection circuit 4 detects S22 from G22, detects S24 from G24, and so on. The second induction signals from the individual subgroups of second coils (G22, G24 . . . ) in the second group G2-2 of second coils may be detected simultaneously, or may be detected subgroup by subgroup. The process of applying the drive signal to the first group G2-1 of second coils and making the first group G2-1 of second coils emit the electromagnetic signals and the process of detecting the second induction signals from the second group G2-2 of second coils may be performed simultaneously or in a time division mode.

In the case that the process of applying the drive signal to the first group G2-1 of second coils and making the first group G2-1 of second coils emit the electromagnetic signals and the process of detecting the second induction signals from the second group G2-2 of second coils are performed simultaneously, the detected induction signals need to be processed. An approach for processing the second induction signal here is same as that described in the step P1 in conjunction with FIGS. 4a and 4b, and it is not repeated here. In brief, in the case that the process of applying the drive signal to the first group G2-1 of second coils and making the first group G2-1 of second coils emit the electromagnetic signals and the process of detecting the second induction signals from the second group G2-2 of second coils are performed simultaneously, induction signals generated due to the first group G2-1 of second coils are removed from the detected second induction signals. In the case that the process of applying the drive signal to the first group G2-1 of second coils and making the first group G2-1 of second coils emit the electromagnetic signals and the process of detecting the second induction signals from the second group G2-2 of second coils are performed in the time division mode, a third selection switch unit (not shown in FIG. 10) may be added on a basis of FIG. 10, to control a time period during which the detection circuit 4 detects the induction signals from the second group G2-2 of second coils. Alternatively, on the basis of FIG. 10, a third signal filtering unit (not shown in FIG. 10) may be added in the detection circuit 4, to remove the signals received from the second group G2-2 of second coils when the first group G2-1 of second coils emit the electromagnetic signals.

Figure 11:
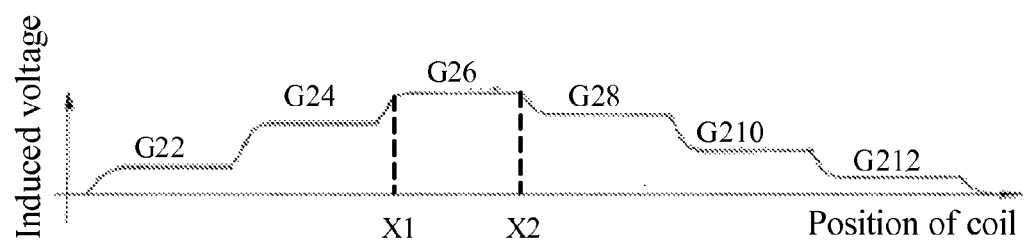
FIG. 11 illustrates induced voltages detected from a second group of second coils shown in FIG. 10.

In addition, there may be many different implementations for the detection circuit 4 to determine the preliminary value of the first direction coordinate of the touch position of the electromagnetic stylus based on the second induction signals. An implementation is illustrated hereinafter in conjunction with FIG. 11. As shown in FIG. 11, the detection circuit 4 detects one induction signal (which is shown as an induced voltage in FIG. 11) from each subgroup of second coils in the second group G2-2 of second coils. The detection circuit 4 selects a position of one subgroup of second coils generating a maximum second induction signal among the second induction signals as the preliminary value of the first direction coordinate of the touch position of the electromagnetic stylus. For example, as shown in FIG. 11, subgroup G26 in the second group G2-2 of second coils generates the maximum second induction signal. Consequently, the position of subgroup G26 is selected as the preliminary value of the first direction coordinate of the touch position of the electromagnetic stylus. The position of subgroup G26 refers to a position where subgroup G26 is arranged in the first direction, which may be a coordinate range from X1 to X2 occupied by subgroup G26 in the first direction or may be a value within the coordinate range from X1 to X2, such as (X1+X2)/2.

With the step P2-2, an approximate touch position of the electromagnetic stylus in the first direction may be quickly determined through emitting the electromagnetic signals only once and receiving the electromagnetic signals only once.

In the step P3, the accurate detection for the second direction coordinate is performed.

The accurate detection for the second direction coordinate may be performed after the preliminary value of the second direction coordinate of the touch position of the electromagnetic stylus is obtained. The step P3 may be or may not be a next step of the step P1.

The accurate detection generally includes: selecting a part of first coils or a part of second coils, applying the drive signal to the selected coils and detecting the induction signals in sequence. Applying the drive signal to each coil and detecting the induction signal includes: applying (generally by the drive circuit) the drive signal to the coil and making the coil emit an electromagnetic signal; generating, by the electromagnetic stylus, an electromagnetic signal (which is referred to as a reflected electromagnetic signal) through resonance after the electromagnetic signal emitted by the coil is received by the electromagnetic stylus; stopping applying the drive signal to the coil; and generating the induction signal by the coil through an induction caused by the reflected electromagnetic signal from the electromagnetic stylus. Each coil generates one induction signal. The touch position of the electromagnetic stylus may be determined based on these induction signals. Both the accurate value of the first direction coordinate and the accurate value of the second direction coordinate of the touch position of the electromagnetic stylus may be determined in the above-described way.

In the accurate detection for the second direction coordinate, the drive circuit selects one subgroup of first coils (such as G16 in FIG. 6) corresponding to the preliminary value of the second direction coordinate of the touch position of the electromagnetic stylus as determined in the step P1, M first coils before the subgroup of first coils, and N first coils after the subgroup of first coils, and then sequentially applies the drive signal to the selected first coils. The induction signals are detected by the detection circuit. Each first coil applied with the drive signal emits an electromagnetic signal, receives an electromagnetic signal from the electromagnetic stylus, and generates a third induction signal. The accurate value of the second direction coordinate of the touch position of the electromagnetic stylus is determined based on the third induction signals, where M and N are natural numbers (which may be 0).

In addition, determining the accurate value of the second direction coordinate of the touch position of the electromagnetic stylus based on the third induction signals may include: performing a function fitting (such as a quadratic function fitting) on these detected third induction signals, and taking a position corresponding to a peak of a fitted curve as the accurate value of the second direction coordinate of the touch position of the electromagnetic stylus.

In the step P4, the accurate detection for the first direction coordinate is performed.

The accurate detection for the first direction coordinate may be performed after the preliminary value of the first direction coordinate of the touch position of the electromagnetic stylus is obtained. The step P4 may be or may not be a next step of the step P2.

A principle of the accurate detection for the first direction coordinate may be referred to what is summarized in the step P3. In the accurate detection for the first direction coordinate, the drive circuit selects one subgroup of second coils (such as G23 in FIG. 9 or G26 in FIG. 11) corresponding to the preliminary value of the first direction coordinate of the touch position of the electromagnetic stylus as determined in step P2, P second coils before the subgroup of second coils, and N second coils after the subgroup of second coils, and then sequentially applies the drive signal to the selected second coils. The induction signals are detected by the detection circuit. Each second coil applied with the drive signal emits an electromagnetic signal, receives an electromagnetic signal from the electromagnetic stylus, and generates a fourth induction signal. The accurate value of the first direction coordinate of the touch position of the electromagnetic stylus is determined based on the fourth induction signals, where P and Q are natural numbers (which may be 0).

In addition, determining the accurate value of the first direction coordinate of the touch position of the electromagnetic stylus based on the fourth induction signals may include: performing a function fitting (such as a quadratic function fitting) on these detected fourth induction signals, and taking a position corresponding to a peak of a fitted curve as the accurate value of the first direction coordinate of the touch position of the electromagnetic stylus.

It should be noted that, the method for detecting the coordinates of the touch position of the electromagnetic stylus (or the method for driving and detecting the electromagnetic-type touch panel) according to the embodiment is illustrated with an example of sequentially performing the following steps: the step P1, the step P2 (which may be the step P2-1 or the P2-2), the step P3 and the step P4. According to other embodiments, a sequence of the four steps may be changed. For example, the step P1, the step P3, the step P2 (which may be the step P2-1 or the P2-2) and the step P4 may be performed sequentially, or the step P1, the step P2 (which may be the step P2-1 or the P2-2), the step P4 and the step P3 may be performed sequentially.

Another Embodiment

Figure 12:
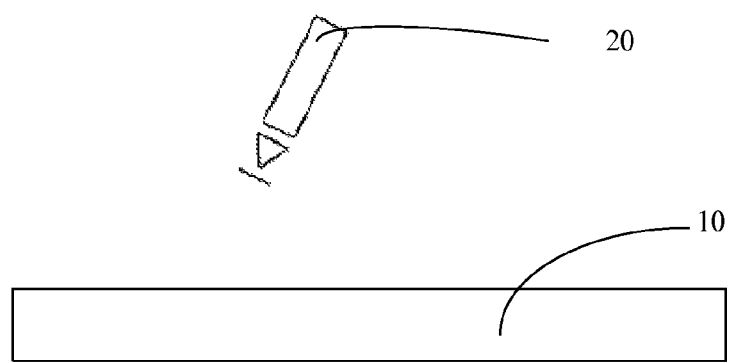
FIG. 12 is a schematic structural diagram of a coordinate input device according to an embodiment of the disclosure.

A coordinate input device according to another embodiment of the disclosure is shown in FIG. 12. The coordinate input device includes an electromagnetic stylus 20 and the electromagnetic-type touch panel 10 according to the above embodiment. The coordinate input device may further include a display panel (not shown in FIG. 12). The electromagnetic-type touch panel 10 and the display panel may be arranged separately (an on-cell type), or the electromagnetic-type touch panel 10 may be integrated in the display panel (an in-cell type). The display panel may be a liquid crystal display panel, an electronic paper, a plasma display panel or an organic light emitting diode display panel.

It should be noted that, according to the above embodiments, the drive circuit proving the drive signal for the first coils and the drive circuit providing the drive signal for the second coils may be integrated into one circuit, or they may be provided separately. Similarly, the detection circuit detecting the induction signals from the first coils and the detection circuit detecting the induction signals from the second coils may be integrated into one circuit, or they may be separately arranged. In addition, the drive circuit and the detection circuit may be formed on the substrate, or they may be formed in a chip. The drive circuit and the detection circuit may be integrated into one circuit chip or they may be separately arranged.

In addition, according to the above embodiments, additional first coils may be provided between subgroups of first coils, and additional second coils may be provided between subgroups of second coils.

Obviously, various changes and variations may be made to the disclosure by those skilled in the art without departing from the spirit and scope of the disclosure. Hence, the disclosure intends to include all changes and variations within the scope of claims of the disclosure and equivalent technologies of the disclosure.

What is claimed is:

1. An electromagnetic-type touch panel for detecting a touch position of an electromagnetic stylus, the touch panel comprising:
   a first substrate;
   a plurality of first coils arranged on the first substrate and extending in a first direction;
   a plurality of second coils arranged on the first substrate and extending in a second direction; and
   a drive circuit and a detection circuit;
   wherein the plurality of first coils are bundled into a plurality of subgroups of first coils, wherein the plurality of subgroups of first coils are divided into a first group of first coils comprising odd numbered subgroups and a second group of first coils comprising even numbered subgroups;
   wherein the first group of first coils connects to the drive circuit, simultaneously receives a first drive signal from the drive circuit and emits a first electromagnetic signal to the electromagnetic stylus;
   wherein the electromagnetic stylus then generates a first reflected electromagnetic signal;
   wherein the second group of first coils connects to the detection circuit via a first element, receives the first reflected electromagnetic signal, and generates a first induction signal;
   wherein the detection circuit detects the first induction signal when the first element is a wire, determines a preliminary value of a second direction coordinate of the touch position of the electromagnetic stylus based on the first induction signal;
   wherein the plurality of second coils are bundled into a plurality of subgroups of second coils, wherein the plurality of subgroups of second coils are divided into a first group of second coils comprising odd numbered subgroups and a second group of second coils comprising even numbered subgroups;
   wherein at least one of the first group of first coils and the second group of first coils connects to the drive circuit, simultaneously receive a second drive signal from the drive circuit and emits a second electromagnetic signal to the electromagnetic stylus;
   wherein the electromagnetic stylus then generates a second reflected electromagnetic signal;
   wherein at least one of the first group of second coils and the second group of second coils connects to the detection circuit via a second element, receives the second reflected electromagnetic signal, and generates a second induction signal;
   wherein the detection circuit detects the second induction signal when the second element is a wire, determines a preliminary value of a first direction coordinate of the touch position of the electromagnetic stylus based on the second induction signal;
   wherein the drive circuit further selects one subgroup of second coils corresponding to the preliminary value of the first direction coordinate of the touch position of the electromagnetic stylus, P second coils before the one subgroup of second coils, and Q second coils after the one subgroup of second coils, and sequentially applies a fourth drive signal to the selected second coils,
   wherein the selected second coils each is applied with the fourth drive signal, emits a fourth electromagnetic signal to the electromagnetic stylus, receives a fourth reflected electromagnetic signal from the electromagnetic stylus, and generates a fourth induction signal, and
   wherein the detection circuit detects the fourth induction signal, determines an accurate value of the first direction coordinate of the touch position of the electromagnetic stylus based on the fourth induction signal, wherein P and Q are positive integers.

2. The electromagnetic-type touch panel according to claim 1,
   wherein the first element connecting the second group of first coils to the detection circuit is a first selection switch unit, the first selection switch unit is off when the first group of first coils emits the first electromagnetic signal, and the first selection switch unit is on when the first group of first coils does not emit the first electromagnetic signal, or
   the detection circuit further comprises a first signal filtering unit configured to remove a signal received from the second group of first coils when the first group of first coils emits the first electromagnetic signal.

3. The electromagnetic-type touch panel according to claim 1, wherein the first group of first coils receive the first drive signal from the drive circuit and emits the first electromagnetic signal to the electromagnetic stylus;
wherein a process
wherein the electromagnetic stylus then generates the first reflected electromagnetic signal, wherein the second group of first coils connects to the detection circuit via the first element, receives the first reflected electromagnetic signal, and generates the first induction signal;
and a process
wherein the electromagnetic stylus generates the second reflected electromagnetic signal; wherein the second group of second coils connects to the detection circuit via the second element, receives the second reflected electromagnetic signal, and generates the second induction signal;
are performed simultaneously.

4. The electromagnetic-type touch panel according to claim 1,
the second element connecting the at least one of the first group of second coils and the second group of second coils to the detection circuit is a second selection switch unit, wherein the second selection switch unit is off when at least one of the first group of first coils and the second group of first coils emits the second electromagnetic signal, and wherein the second selection switch unit is on when at least one of the first group of first coils and the second group of first coils does not emit the second electromagnetic signal; or
wherein the detection circuit further comprises a second signal filtering unit configured to remove a signal received from at least one of the first group of second coils and the second group of second coils when at least one of the first group of first coils and the second group of first coils emits the second electromagnetic signal.

5. The electromagnetic-type touch panel according claim 1,
wherein the drive circuit further selects one subgroup of first coils corresponding to the preliminary value of the second direction coordinate of the touch position of the electromagnetic stylus, M first coils before the one subgroup of first coils, and N first coils after the one subgroup of first coils, and sequentially applies a third drive signal to the selected first coils,
wherein the selected first coils each is applied with the third drive signal, emits a third electromagnetic signal to the electromagnetic stylus, receives a third reflected electromagnetic signal from the electromagnetic stylus, and generates a third induction signal, and
wherein the detection circuit detects the third induction signal, determines an accurate value of the second direction coordinate of the touch position of the electromagnetic stylus based on the third induction signal, wherein M and N are positive integers.

6. A coordinate input device, comprising an electromagnetic stylus and an electromagnetic-type touch panel for detecting a touch position of the electromagnetic stylus according to claim 1.

7. A method for driving and detecting an electromagnetic-type touch panel, wherein the method is for detecting a touch position of an electromagnetic stylus, wherein the electromagnetic-type touch panel comprises a first substrate, a plurality of first coils extending in a first direction and a plurality of second coils extending in a second direction, wherein the first coils and the second coils are arranged on the first substrate;

wherein the plurality of first coils are bundled into a plurality of subgroups of first coils, wherein the plurality of subgroups of first coils are divided into a first group of first coils comprising odd numbered subgroups and a second group of first coils comprising even numbered subgroups;
wherein the plurality of second coils are bundled into a plurality of subgroups of second coils, wherein the plurality of subgroups of second coils are divided into a first group of second coils comprising odd numbered subgroups and a second group of second coils comprising even numbered subgroups;
wherein the method for driving and detecting the electromagnetic-type touch panel comprises:
performing a preliminary detection; and
performing an accurate detection;
wherein performing the preliminary detection comprises performing a preliminary detection for a second direction coordinate, wherein performing the preliminary detection for the second direction coordinate comprises:
applying a first drive signal simultaneously to the first group of first coils, and causing the first group of first coils to emit a first electromagnetic signal to the electromagnetic stylus;
receiving, by the second group of first coils, a first reflected electromagnetic signal which are generated by the electromagnetic stylus based on the first electromagnetic signal, from the electromagnetic stylus;
generating, by the second group of first coils, a first induction signal based on the first reflected electromagnetic signal;
detecting the first induction signal from the second group of first coils; and
determining a preliminary value of the second direction coordinate of the touch position of the electromagnetic stylus based on the first induction signal;
wherein performing the preliminary detection further comprises performing a preliminary detection for the first direction coordinate, and wherein performing the preliminary detection for the first direction coordinate comprises a process A or a process B:
wherein the process A comprises:
applying a second drive signal simultaneously to at least one of the first group of first coils and the second group of first coils, and causing at least one of the first group of first coils and the second group of first coils to emit a second electromagnetic signal;
detecting a second induction signal from the first group of second coils or from the second group of second coils; and
determining a preliminary value of the first direction coordinate of the touch position of the electromagnetic stylus based on the second induction signals;
wherein the process B comprises:
applying a second drive signal simultaneously to the first group of second coils and causing the first group of second coils to emit a second electromagnetic signal;
detecting a second induction signal from the second group of second coils; and
determining a preliminary value of the first direction coordinate of the touch position of the electromagnetic stylus based on the second induction signal;
wherein performing the accurate detection comprises performing an accurate detection for the first direction coordinate, and performing the accurate detection for the first direction coordinate comprises:
wherein the method for driving and detecting the electromagnetic-type touch panel further comprises:
selecting one subgroup of second coils corresponding to the preliminary value of the first direction coordinate of the touch position of the electromagnetic stylus, P second coils before the one subgroup of second coils, and Q second coils after the one subgroup of second coils, sequentially applying a drive signal to the selected second coils;
emitting a fourth electromagnetic signal;
receiving a fourth electromagnetic signal from the electromagnetic stylus;
generating a fourth induction signal, by each second coil applied with the drive signal; and
determining an accurate value of the first direction coordinate of the touch position of the electromagnetic stylus based on the fourth induction signal, wherein P and Q are positive integers.

8. The method for driving and detecting the electromagnetic-type touch panel according to claim 7, wherein:
the applying the first drive signal simultaneously to the first group of first coils and the detecting the first induction signal from the second group of first coils are performed in a time division mode, or
a part of the detected first induction signal, which is generated when the first group of first coils emits the first electromagnetic signal, is removed.

9. The method for driving and detecting the electromagnetic-type touch panel according to claim 7,
wherein the detecting the first induction signal from the second group of first coils and the detecting the second induction signal from at least one of the first group of second coils and the second group of second coils are performed simultaneously, after the first drive signal is applied simultaneously to the first group of first coils and the first group of first coils emits the first electromagnetic signal, and
wherein the preliminary value of the first direction coordinate of the touch position of the electromagnetic stylus is determined based on the second induction signal.

10. The method for driving and detecting the electromagnetic-type touch panel according to 7, wherein performing the accurate detection comprises performing an accurate detection for the second direction coordinate, and performing the accurate detection for the second direction coordinate comprises:
selecting one subgroup of first coils corresponding to the preliminary value of the second direction coordinate of the touch position of the electromagnetic stylus, M first coils before the one subgroup of first coils, and N first coils after the one subgroup of first coils, sequentially applying a third drive signal to the selected first coils;
emitting a third electromagnetic signal;
receiving a third reflected electromagnetic signal from the electromagnetic stylus;
generating a third induction signal, by each first coil applied with the third drive signal; and
determining an accurate value of the second direction coordinate of the touch position of the electromagnetic stylus based on the third induction signal, wherein M and N are positive integers.

11. An electromagnetic-type touch panel for detecting a touch position of an electromagnetic stylus, wherein the touch panel comprising:

a first substrate;
a plurality of first coils arranged on the first substrate and extending in a first direction;
a plurality of second coils arranged on the first substrate and extending in a second direction; and
a drive circuit and a detection circuit;
wherein the plurality of first coils are bundled into a plurality of subgroups of first coils, wherein the plurality of subgroups of first coils are divided into a first group of first coils comprising odd numbered subgroups and a second group of first coils comprising even numbered subgroups;
wherein the first group of first coils connects to the drive circuit, simultaneously receives a first drive signal from the drive circuit and emits a first electromagnetic signal to the electromagnetic stylus;
wherein the electromagnetic stylus then generates a first reflected electromagnetic signal;
wherein the second group of first coils connects to the detection circuit via a first element, receives the first reflected electromagnetic signal, and generates a first induction signal;
wherein the detection circuit detects the first induction signal when the first element is a wire, determines a preliminary value of a second direction coordinate of the touch position of the electromagnetic stylus based on the first induction signal;
wherein the plurality of second coils are bundled into a plurality of subgroups of second coils, wherein the plurality of subgroups of second coils are divided into a first group of second coils comprising odd numbered subgroups and a second group of second coils comprising even numbered subgroups;
wherein the first group of second coils simultaneously receives a second drive signal from the drive circuit and emits a second electromagnetic signal to the electromagnetic stylus;
wherein the electromagnetic stylus then generates a second reflected electromagnetic signal;
wherein the second group of second coils connects to the detection circuit via a third element, receives the second reflected electromagnetic signal, and generates a second induction signal;
wherein the detection circuit detects the second induction signal when the third element is a wire, determines a preliminary value of a first direction coordinate of the touch position of the electromagnetic stylus based on the second induction signal;
wherein the drive circuit further selects one subgroup of second coils corresponding to the preliminary value of the first direction coordinate of the touch position of the electromagnetic stylus, P second coils before the one subgroup of second coils, and Q second coils after the one subgroup of second coils, and sequentially applies a fourth drive signal to the selected second coils,
wherein the selected second coils each is applied with the fourth drive signal, emits a fourth electromagnetic signal to the electromagnetic stylus, receives a fourth reflected electromagnetic signal from the electromagnetic stylus, and generates a third induction signal; and
wherein the detection circuit detects the fourth induction signal, determines an accurate value of the first direction coordinate of the touch position of the electromagnetic stylus based on the fourth induction signal.

12. The electromagnetic-type touch panel according to claim 11, wherein the third element connecting the second group of second coils to the detection circuit is a third selection switch unit, the third selection switch unit is off when the first group of second coils emits the third electromagnetic signal, and the third selection switch unit is on when the first group of second coils does not emit the first electromagnetic signal; or wherein the detection circuit further comprises a third signal filtering unit configured to remove a signal received from the second group of second coils when the first group of second coils emit the electromagnetic signal.

13. The electromagnetic-type touch panel according to claim 11, wherein the first element connecting the second group of first coils to the detection circuit is a first selection switch unit, the first selection switch unit is off when the first group of first coils emits the first electromagnetic signal, and the first selection switch unit is on when the first group of first coils does not emit the first electromagnetic signal; or wherein the detection circuit further comprises a first signal filtering unit configured to remove a signal received from the second group of first coils when the first group of first coils emits the first electromagnetic signal.

14. The electromagnetic-type touch panel according to claim 11, wherein the first group of first coils receive the first drive signal from the drive circuit and emits the first electromagnetic signal to the electromagnetic stylus;

wherein two processes A and B are performed simultaneously, wherein in process A:

the electromagnetic stylus then generates the first reflected electromagnetic signal, wherein the second group of first coils connects to the detection circuit via the first element, receives the first reflected electromagnetic signal, and generates the first induction signal;

and wherein in process B:

the electromagnetic stylus generates the second reflected electromagnetic signal; wherein the second group of second coils connects to the detection circuit via the second element, receives the second reflected electromagnetic signal, and generates the second induction signal.

15. The electromagnetic-type touch panel according to claim 11, wherein the second element connecting the at least one of the first group of second coils and the second group of second coils to the detection circuit is a second selection switch unit, wherein the second selection switch unit is off when at least one of the first group of first coils and the second group of first coils emits the second electromagnetic signal, and wherein the second selection switch unit is on when at least one of the first group of first coils and the second group of first coils does not emit the second electromagnetic signal; or wherein the detection circuit further comprises a second signal filtering unit configured to remove a signal received from at least one of the first group of second coils and the second group of second coils when at least one of the first group of first coils and the second group of first coils emits the second electromagnetic signal.

16. The electromagnetic-type touch panel according claim 11, wherein the drive circuit further selects one subgroup of first coils corresponding to the preliminary value of the second direction coordinate of the touch position of the electromagnetic stylus, M first coils before the one subgroup of first coils, and N first coils after the one subgroup of first coils, and sequentially applies a third drive signal to the selected first coils, wherein the selected first coils each is applied with the third drive signal, emits a third electromagnetic signal to the electromagnetic stylus, receives a third reflected electromagnetic signal from the electromagnetic stylus, and generates a third induction signal, and wherein the detection circuit detects the third induction signal, determines an accurate value of the second direction coordinate of the touch position of the electromagnetic stylus based on the third induction signal, wherein M and N are positive integers.

17. A coordinate input device, comprising an electromagnetic stylus and an electromagnetic-type touch panel for detecting a touch position of the electromagnetic stylus according to claim 11.

* * * * *